(12) United States Patent
Bando et al.

(10) Patent No.: US 7,029,787 B2
(45) Date of Patent: Apr. 18, 2006

(54) POWER SUPPLY UNIT

(75) Inventors: Masashi Bando, Saitama (JP); Atsuhiro Naganuma, Saitama (JP); Satoyoshi Oya, Saitama (JP); Kentaro Shibuya, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 392 days.

(21) Appl. No.: 10/377,105

(22) Filed: Mar. 3, 2003

(65) Prior Publication Data
US 2004/0043287 A1 Mar. 4, 2004

(30) Foreign Application Priority Data
Mar. 5, 2002 (JP) ............................. 2002-058836
Mar. 28, 2002 (JP) ............................. 2002-092417
Feb. 21, 2003 (JP) ............................. 2003-044206

(51) Int. Cl.
*H01M 6/42* (2006.01)
*H01R 24/00* (2006.01)

(52) U.S. Cl. .................... 429/156; 429/159; 429/164; 429/99; 439/627

(58) Field of Classification Search ............... 429/156, 429/159, 164, 158, 160, 149, 151, 120, 99, 429/100; 320/112, 116, 110, 107, 120, 150; 439/627
See application file for complete search history.

(56) References Cited

U.S. PATENT DOCUMENTS 6,225,788 B1 * 5/2001 Kouzu et al. ................ 320/150
6,340,877 B1 * 1/2002 Mita et al. ................... 320/112
2005/0064280 A1 * 3/2005 Watanabe et al. ........... 429/120

FOREIGN PATENT DOCUMENTS

| JP | 10-255859 | 9/1998 |
| JP | 11-111349 | 4/1999 |
| JP | 2001-155702 | 6/2001 |

* cited by examiner

*Primary Examiner*—Raymond Alejandro
(74) *Attorney, Agent, or Firm*—Arent Fox PLLC

(57) ABSTRACT

A battery-type power supply unit includes a plurality of rod-shaped battery modules having a plurality of batteries connected together in series. Held tightly between two opposing ends of two batteries is an insulating ring having annular recesses into which these two ends can fit. Each battery module runs through and is supported by two plate-shaped members that are kept vertical on a base plate by frame members. Each plate-shaped member is an assembly of a plurality of grommets formed from two split halves. Connections between bus-bars and positive and negative electrodes of the battery modules can move toward and away from the positive and negative electrodes.

5 Claims, 24 Drawing Sheets

POWER SUPPLY UNIT

BACKGROUND OF THE INVENTION

1. Field of the Invention

The present invention relates to a battery-type power supply unit, and in particular to a power supply system that includes a battery assembly in which a plurality of rod-shaped battery modules are arranged so that the axes thereof are parallel to each other and, in an imaginary plane intersecting these axes, points of intersection of the axes and the imaginary plane are aligned in both the vertical direction and the lateral direction, the rod-shaped battery modules having a plurality of batteries that are connected together in series.

This type of battery-type power supply unit is mounted on a battery car, a hybrid car, a fuel cell vehicle, etc. and used as a power source. The battery concept referred to here includes those having various types of storage function such as a large capacity electric double-layer capacitor as well as a primary battery and a secondary battery.

2. Description of the Related Art

As this type of power supply system, there is a conventionally known arrangement in which synthetic resin end plates having a plurality of bus-bars embedded therein are secured by screws to the outsides of opposite end walls of a synthetic resin box, the positive electrode and the negative electrode at opposite ends of battery modules running through the box are connected to the corresponding bus-bar by means of a bolt that runs through the bus-bar and is screwed into the positive or negative electrode, and an axially middle section of each battery module is floatingly supported by means of a plurality of vibration-isolating rubber sheets. In this case, provided between two adjacent batteries of each battery module is an insulating ring for preventing a short circuit between the positive and negative electrodes (see, for example, Japanese Patent Application Laid-open No. 11-111349).

However, in the conventional system, since each battery module is supported by substantially its opposite ends, vibration causes a large amplitude of oscillation of each battery module, leading to a possibility that it might break the connection between the positive and negative electrodes of two adjacent batteries. Furthermore, since the bus-bars are fixedly embedded in the end plates, any variation in the axial dimension of the battery modules cannot easily be accommodated. Moreover, since the synthetic resin box has comparatively large dimensions and is required to have quite precise dimensions, the cost for a mold is very high, thereby resulting in an increase in the cost of the power supply system as well as causing an increase in weight.

As this type of battery-type power supply unit, there is also known an arrangement in which a dedicated cooling air duct or a plurality of cooling members are arranged within a battery assembly in order to cool a plurality of rod-shaped battery modules forming the assembly (see, for example, Japanese Patent Application Laid-open No. 10-255859).

However, it is difficult to reduce the dimensions of this conventional system since the cooling duct, etc. hinders the rod-shaped battery modules from being placed closer to each other. Moreover, the production cost inevitably increases due to a large number of components.

SUMMARY OF THE INVENTION

It is an object of the present invention to provide a low-cost and light-weight battery-type power supply unit of the above-mentioned type that can prevent breakage of the connection between positive and negative electrodes of two adjacent batteries in each battery module, and can make it easy to connect positive and negative electrodes of each battery module to bus-bars even when there are variations in the axial dimension of the battery modules.

In order to accomplish the above object, an aspect of the present invention provides a battery-type power supply unit that includes a battery assembly in which a plurality of rod-shaped battery modules having a plurality of batteries connected together in series and having a positive electrode at one end and a negative electrode at the other end are arranged so that the axes of the battery modules are parallel to each other and, in an imaginary plane intersecting these axes, points of intersection of the axes and the imaginary plane are aligned in both the vertical direction and the lateral direction, the battery assembly having positive/negative electrode groups that are formed from a plurality of positive electrodes and a plurality of negative electrodes and are disposed at axially opposite ends of the battery modules; an insulating ring being held tightly between two opposing ends of adjacent batteries of each battery module, the insulating ring having annular recesses into which these two ends can fit, a connection between a positive electrode and a negative electrode being in a region surrounded by an inner peripheral surface of the insulating ring; each battery module running through and being retained by a plurality of plate-shaped members that stand on a base plate so as to be parallel to the imaginary plane; each plate-shaped member being kept vertical by a gantry-shaped frame member that has an upper linking portion abutting against an upper end face of the plate-shaped member and has legs fixed to the base plate; each plate-shaped member being an assembly of a plurality of grommets formed from two split halves, the two halves having a semi-annular recess that opens on the split surface and is fitted around a semi-circumferential portion of an outer peripheral surface of the insulating ring; and a plurality of through holes into each of which the positive or negative electrode is fitted, and a plurality of bus-bars that are each connected to the positive or negative electrode fitted in the through hole being provided in each bus-bar plate facing each positive/negative electrode group of the battery assembly such that the connection between each bus-bar and the positive or negative electrode can move toward and away from the positive or negative electrode.

In accordance with this arrangement, since each battery module is retained on the base plate by the plate-shaped member and the frame member via the insulating rings at a plurality of positions in the axial direction of the battery module, and the connection between the positive electrode and the negative electrode of the two adjacent batteries is reinforced by the insulating ring, it is possible to reliably prevent vibration from breaking the connection between the positive and negative electrodes.

Furthermore, even if there are variations in the axial dimension among the battery modules, moving the connection between each bus-bar and the positive or negative electrode relative to the positive or negative electrode enables the bus-bar and the positive or negative electrode to be easily connected together. Moreover, since a comparatively large synthetic resin box that requires quite precise dimensions is not used for supporting the battery assembly, the cost of the battery-type power supply unit can be reduced and the weight thereof can be lightened.

Furthermore, in addition to the above-mentioned arrangement, another aspect of the present invention provides a battery-type power supply unit in which a recess and a projection that can be fitted together are provided on an inner peripheral surface of the semi-annular recess of the two halves of each grommet and the outer peripheral surface of each insulating ring that fits with the inner peripheral surface of the two semi-annular recesses.

In accordance with this arrangement, in addition to the above-mentioned effects, there is provided a battery-type power supply unit that facilitates positioning of each grommet and each battery module.

Moreover, in addition to the above-mentioned arrangement, yet another aspect of the present invention provides a battery-type power supply unit in which a recess and a projection that can be fitted together are provided on the inner peripheral surface of the semi-annular recess of the two halves of each grommet and the outer peripheral surface of each insulating ring that fits with the inner peripheral surface of the two semi-annular recesses, and a position where the recess and the projection are fitted together in one of two adjacent battery modules is displaced in the axial direction of the battery modules from a position where the recess and the projection are fitted together in the other of the two adjacent battery modules.

In accordance with this arrangement, each grommet and each battery module can be positioned easily, and there is also an effect of preventing an erroneous combination of battery modules.

Furthermore, yet another aspect of the present invention provides a battery-type power supply unit that includes a battery assembly in which a plurality of rod-shaped battery modules having a plurality of batteries connected together in series and having a positive electrode at one end and a negative electrode at the other end are arranged so that the axes of the battery modules are parallel to each other and, in an imaginary plane intersecting these axes, points of intersection of the axes and the imaginary plane are aligned in both the vertical direction and the lateral direction, the battery assembly having positive/negative electrode groups that are formed from a plurality of positive electrodes and a plurality of negative electrodes and are disposed at axially opposite ends of the battery modules; wherein a plurality of through holes into each of which the positive or negative electrode is fitted, and a plurality of bus-bars that are each connected to the positive or negative electrode fitted in the through hole are provided in each bus-bar plate facing each positive/negative electrode group of the battery assembly such that the connections between each bus-bar and the positive or negative electrode can move toward and away from the positive or negative electrode.

In accordance with this arrangement, there can be provided a battery-type power supply unit that can easily provide connections between bus-bars and positive and negative electrodes even if there are variations in the axial dimension among the battery modules.

It is another object of the present invention to provide a battery-type power supply unit of the above-mentioned type that can reduce the dimensions and decrease the production cost and substantially equally cool a plurality of rod-shaped battery modules.

In order to attain this object, in accordance with the present invention, there is provided a battery-type power supply unit that includes a box having at one end a cooling air infeed part and at the other end a cooling air outfeed part, and a battery assembly disposed within the box; the battery assembly having first to third battery module groups that are arranged at intervals in parallel to each other along the direction of flow of the cooling air; the first to third battery module groups being formed from a plurality of rod-shaped battery modules that are arranged at equal intervals so that their axes intersect the direction of flow of the cooling air within an imaginary plane intersecting the direction of flow of the cooling air; the axes of one rod-shaped battery module and another rod-shaped battery module that are adjacent to each other in the direction of flow of the cooling air being positioned within an imaginary plane that is parallel to the direction of flow of the cooling air; wherein the battery-type power supply unit includes a first rectifying plate disposed on the cooling air infeed part side of the first battery module group that is present in the position closest to the cooling air infeed part, a second rectifying plate disposed between the second and third battery module groups, and a third rectifying plate disposed on the cooling air outfeed part side of the third battery module group; the first rectifying plate having a plurality of strip-shaped portions that extend in the axial direction of the plurality of rod-shaped battery modules of the first battery module group and face these rod-shaped battery modules across a gap, and a plurality of slits that are present between two adjacent strip-shaped portions and face a space between two adjacent battery modules, satisfying the relationship $w_1 \geq e$ where e is the outer diameter of the rod-shaped battery module and $w_1$ is the width of the strip-shaped portion corresponding to the outer diameter e; the second rectifying plate having a plurality of slits that face the outer peripheral surface of each rod-shaped battery module of the second and third battery module groups, satisfying the relationship $e > w_2$ where e is the outer diameter of the rod-shaped battery module and $w_2$ is the width of the slit corresponding to the outer diameter e; and the third rectifying plate having a plurality of slits that face the outer peripheral surface of each rod-shaped battery module of the third battery module group, satisfying the relationship $e > w_3$ where e is the outer diameter of the rod-shaped battery module and $w_3$ is the width of the slit corresponding to the outer diameter e.

In accordance with this arrangement, the plurality of rod-shaped battery modules forming the first battery module group are cooled by exposure of substantially two fourths of the outer peripheral surface of each module to cooling air flowing past both sides thereof; the plurality of rod-shaped battery modules forming the second battery module group are cooled by exposure of substantially three fourths of the outer peripheral surface of each module to cooling air flowing past both sides thereof and flowing into the slits of the second rectifying plate; and the plurality of rod-shaped battery modules forming the third battery module group are cooled by exposure of the entire outer peripheral surface of each module to cooling air flowing past the slits of the second rectifying plate, along the outer peripheral surface of the rod-shape battery modules, and finally into the slits of the third rectifying plate.

Although the cooling performance of cooling air deteriorates while traveling from the first battery module group to the second battery module group and further to the third battery module group, since the area of the rod-shaped battery modules that are exposed to cooling air increases accordingly, all the rod-shaped battery modules can be cooled substantially equally.

DESCRIPTION OF THE PREFERRED EMBODIMENTS

[Embodiment I]

Figure 1:
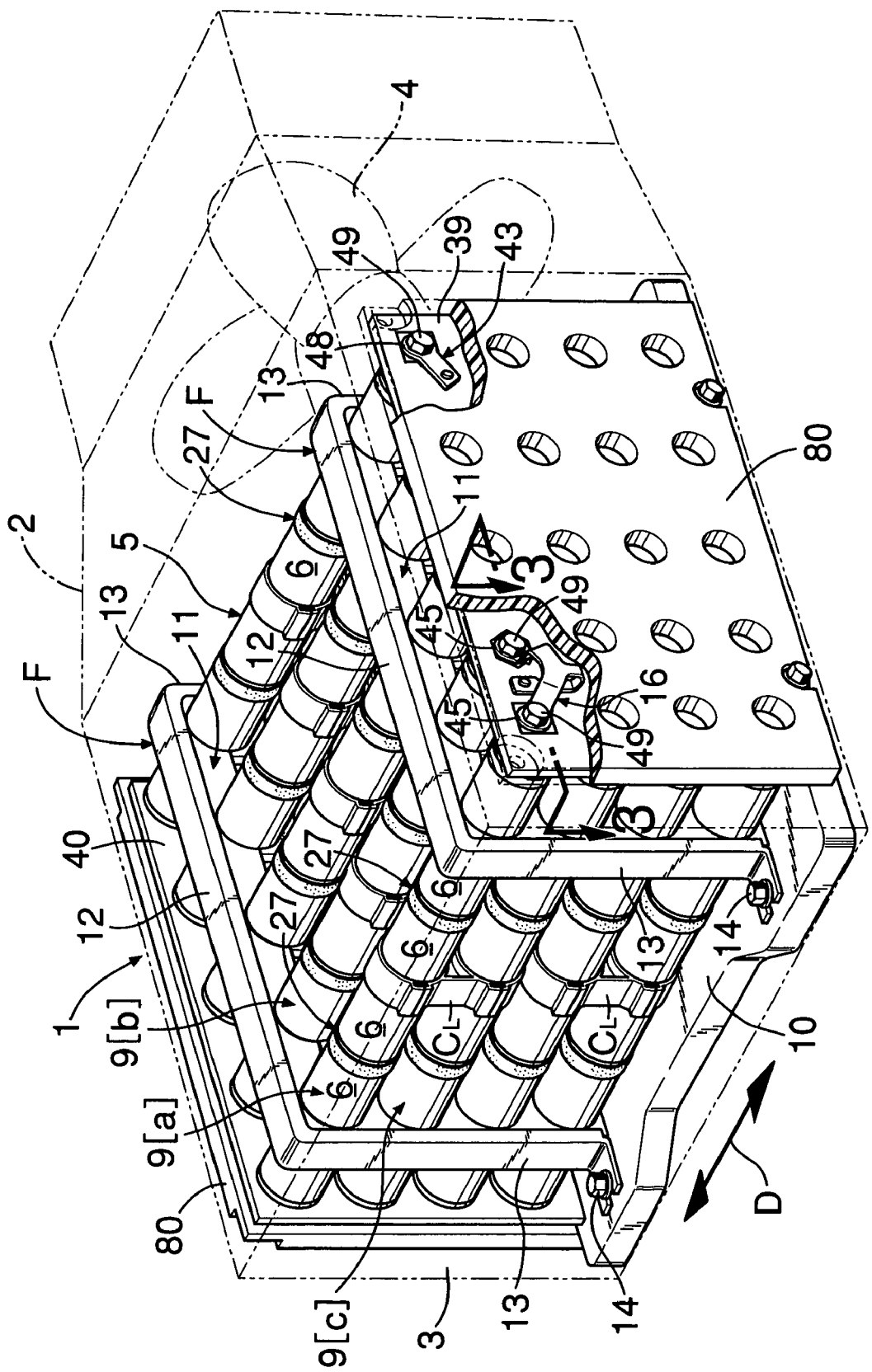
FIG. 1 is a perspective view of a battery-type power supply unit of Embodiment I.
Figure 2:
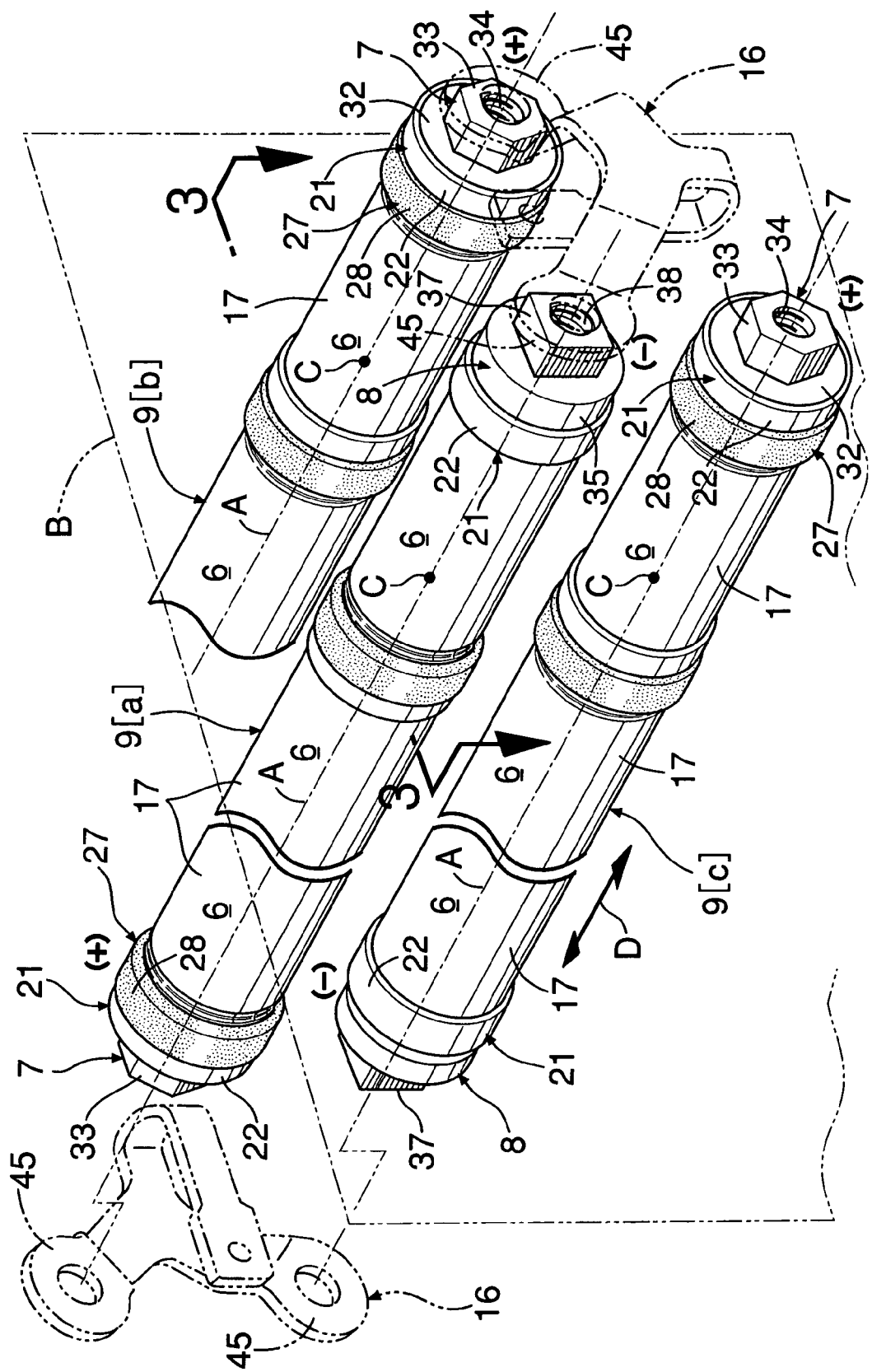
FIG. 2 is a perspective view of battery modules.

Referring to FIGS. 1 and 2, a battery-type power supply unit 1 includes a thin synthetic resin box 2. The box 2 has a cooling air inlet 3 in a face at one end and a suction fan 4 within a section at the other end. A battery assembly 5 is housed within the box 2 between the cooling air inlet 3 and the suction fan 4, that is, in a middle section within the box 2.

The battery assembly 5 includes a plurality, 20 in the embodiment, of rod-shaped battery modules 9 that are each formed from a plurality, six in the embodiment, of batteries 6 connected together in series, and each has a positive electrode 7 at one end and a negative electrode 8 at the other end. These battery modules 9 are arranged so that axes A thereof are parallel to each other and, on an imaginary plane B intersecting these axes A. There are four points of intersection C of the axes A and the imaginary plane B in the vertical direction and five in the lateral direction. Positive/negative electrode groups that include a plurality of, that is, 10, positive electrodes 7 and a plurality of, that is, 10, negative electrodes 8 are present at each of opposite ends in the axial direction D of the battery module. Each battery module 9 runs through and is retained by a plurality, two in the embodiment, of plate-shaped members 11 that are parallel to the imaginary plane B and stand on a steel base plate 10. Each plate-shaped member 11 is kept vertical by a gantry-shaped steel frame member F that has its upper linking portion 12 abutting against the upper end face of the plate-shaped member 11 and that has both its legs 13 fixed to the base plate 10 by means of bolts 14 and nuts 15 (see FIG. 8). Axially middle sections of the battery module 9 in the top row and the battery module 9 in a row second from the top, and middle sections in the axial direction of the battery module 9 in the bottom row and the battery module 9 in a row second from the bottom are respectively linked by synthetic resin clips $C_L$.

Figure 3:
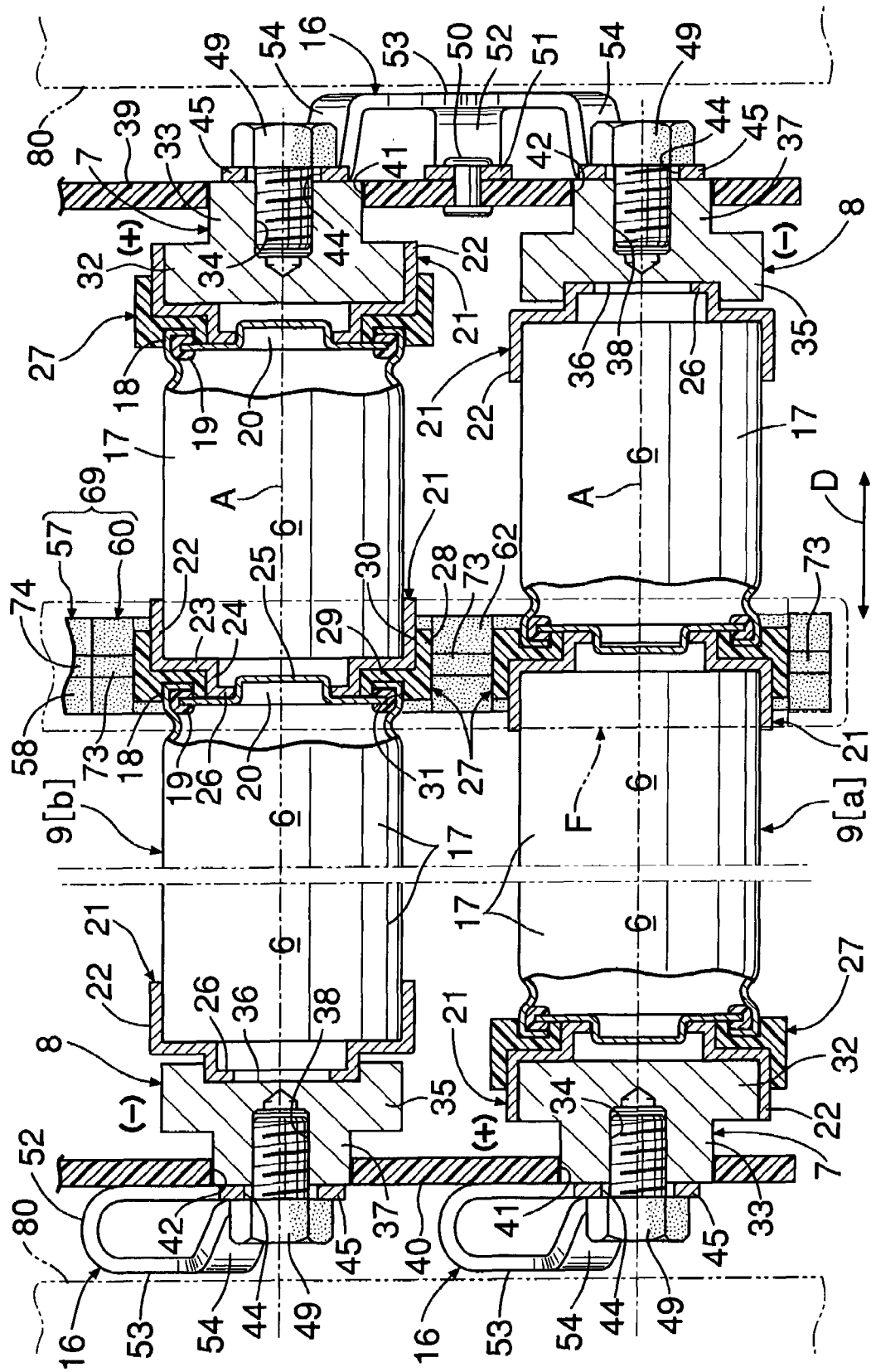
FIG. 3 is a cross section along line 3—3 in FIG. 2.

For example, when the battery assembly 5 is viewed from the cooling air inlet 3 side in FIG. 1, the rod-shaped battery module 9[a] in the top row at the front has the negative electrode 8 at the right end and the positive electrode 7 at the left end as shown in FIGS. 2 and 3. The negative electrode 8 is connected via a first bus-bar 16 to the positive electrode 7 of the adjacent battery module 9[b] that is present on the suction fan 4 side. On the other hand, the positive electrode 7 of the battery module 9[a] is connected via another first bus-bar 16 to the negative electrode 8 of the battery module 9[c] that is present below the battery module 9[a].

Each of the batteries (secondary batteries) 6 has a bottomed steel tube 17 on the negative electrode side and a steel plate lid 20 on the positive electrode side, the plate lid 20 being mounted via an insulating sealing ring 19 on the inner peripheral surface of an annular bead 18 present at the open end of the bottomed tube 17. In the embodiment, the interior structure of the battery 6 is omitted. A steel connecting ring 21 is welded between the bottomed tube 17 of one of the batteries 6 and the plate lid 20 of another adjacent battery 6. The connecting ring 21 has a large diameter short tubular portion 22, an inwardly projecting annular large diameter portion 23, a small diameter short tubular portion 24, and an inwardly projecting small diameter annular portion 26. The large diameter short tubular portion 22 is fitted around and welded to the outer peripheral surface of the bottomed tube 17. The large diameter annular portion 23 is connected to the peripheral edge of the large diameter short tubular portion 22 and is in intimate contact with the outer surface of the bottom wall of the bottomed tube 17. The small diameter tubular portion 24 is connected to the inner peripheral edge of the large diameter annular portion 23 and projects in a direction opposite to the large diameter short tubular portion 22. The small diameter annular portion 26 is connected to the peripheral edge of the small diameter tubular portion 24, has an opening, through which a circular projecting portion 25 of the plate lid 20 is inserted, and is welded to the periphery of the circular projecting portion 25.

A synthetic resin insulating ring 27 is held tightly between opposing ends of the two adjacent batteries 6. The insulating ring 27 has a short tubular portion 28 and an inwardly projecting annular portion 29. Fitted into the short tubular portion 28 is substantially half of the outer peripheral surface of the large diameter short tubular portion 22 of the connecting ring 21 forming an end of said one battery 6. The inwardly projecting annular portion 29 is connected to the peripheral edge at one end of the short tubular portion 28 and is in intimate contact with the outer surface of the large diameter annular portion 23 of the connecting ring 21. The short tubular portion 28 and the inwardly projecting annular portion 29 form an annular recess 30 into which the end of said one battery 6 is fitted. The inwardly projecting annular portion 29 has an annular recess 31 into which is fitted the annular bead 18 of said other battery 6 and the insulating sealing ring 19 fitted thereinto, that is, an end of said other battery 6. The opening of the inwardly projecting annular portion 29 is in intimate contact with the outer peripheral surface of the small diameter short tubular portion 24 of the connecting ring 21, and as a result the connection between the plate lid 20 and the connecting ring 21, that is, the connection between the positive electrode and the negative electrode, is located in a region surrounded by an inner peripheral surface of the insulating ring 27. This insulating ring 27 has a function of preventing a short circuit between positive and negative electrodes of two batteries 6 and a function of reinforcing the connection thereof.

Figure 4:
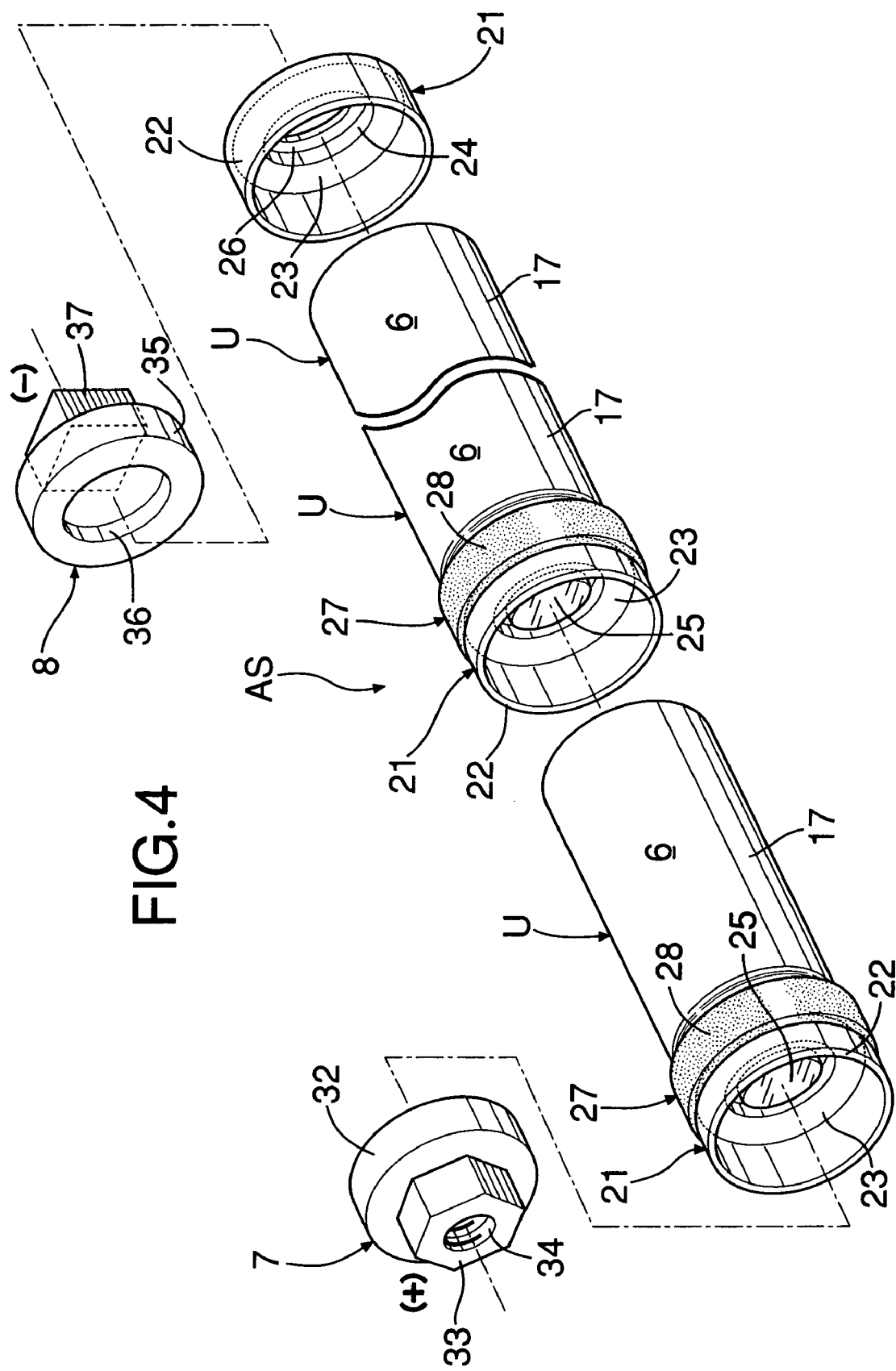
FIG. 4 is an exploded perspective view of the battery module.

As is shown in FIG. 4, the battery 6, the connecting ring 21, and the insulating ring 27 form one unit U. When fabricating the battery module 9, the bottom side of the bottomed tube 17 of one unit U is fitted into the large diameter short tubular portion 22 of the connecting ring 21 of the other unit U, the gap between the large diameter short tubular portion 22 and the peripheral wall of the bottomed tube 17 is welded together, this is repeated a required number of times, and the bottom of the bottomed tube 17 of the unit U at one end is fitted into and welded to the large diameter short tubular portion 22 of the connecting ring 21. Furthermore, a large diameter portion 32 of the positive electrode 7, which is made of steel and has a convex cross section, is fitted into the large diameter short tubular portion 22 of the connecting ring 21 that is present at the other end, and the large diameter portion 32 and the large diameter short tubular portion 22 are welded together. A hexagonal nut-shaped portion 33 projecting from the large diameter portion 32 has a threaded hole 34 opening on an end surface of the hexagonal nut-shaped portion 33. Fitted around the small diameter tubular portion 24 of the connecting ring at said one end is a recess 36 in an end surface of a large diameter portion 35 of the negative electrode 8, which is made of steel and has a substantially convex cross section. The annular small diameter projecting portion 26 and the large diameter portion 35 are welded together. A square nut-shaped portion 37 projecting from the large diameter portion 35 has a threaded hole 38 opening on an end surface of the square nut-shaped portion 37.

Figure 5:
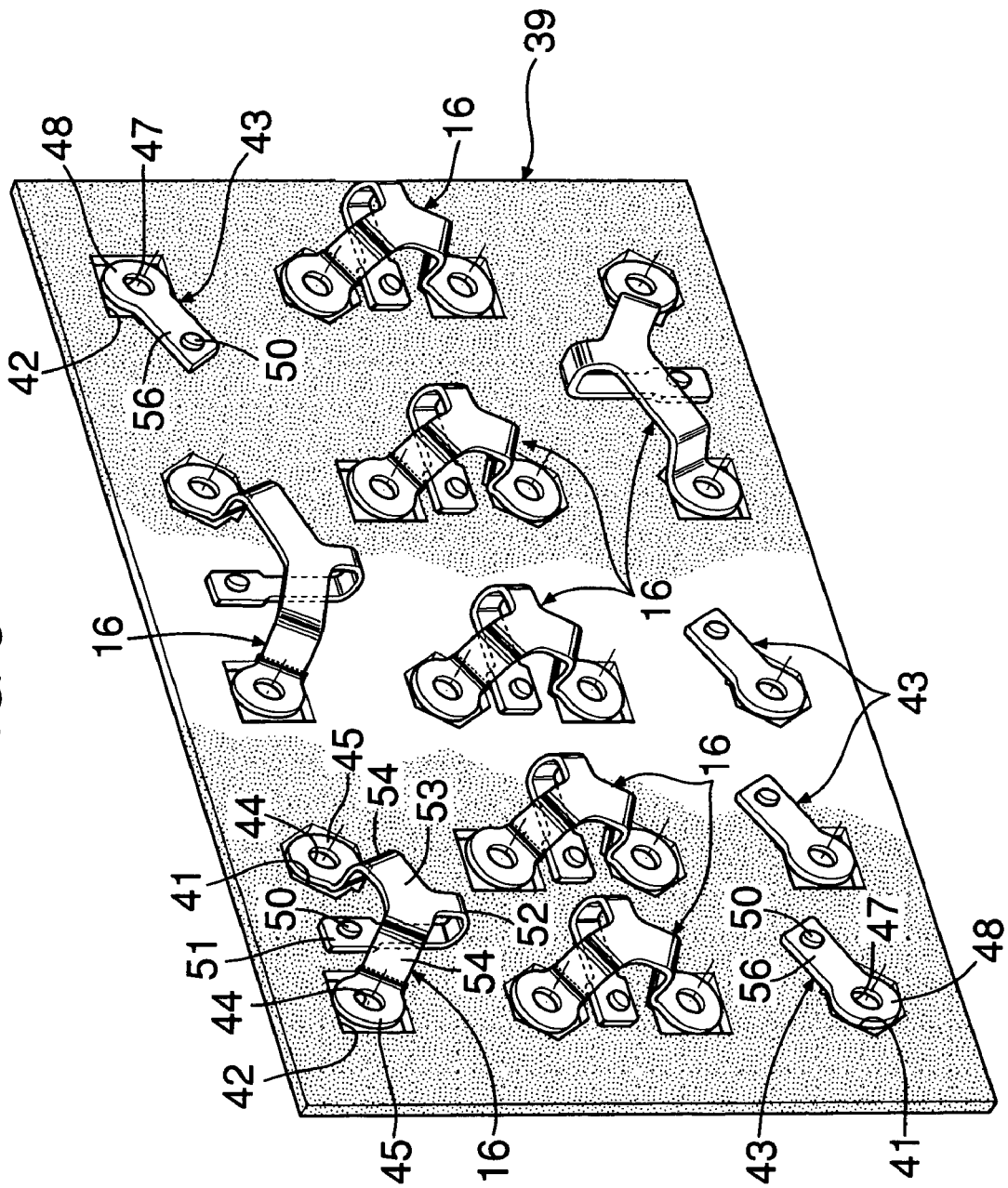
FIG. 5 is a perspective view of a first bus-bar plate.
Figure 6:
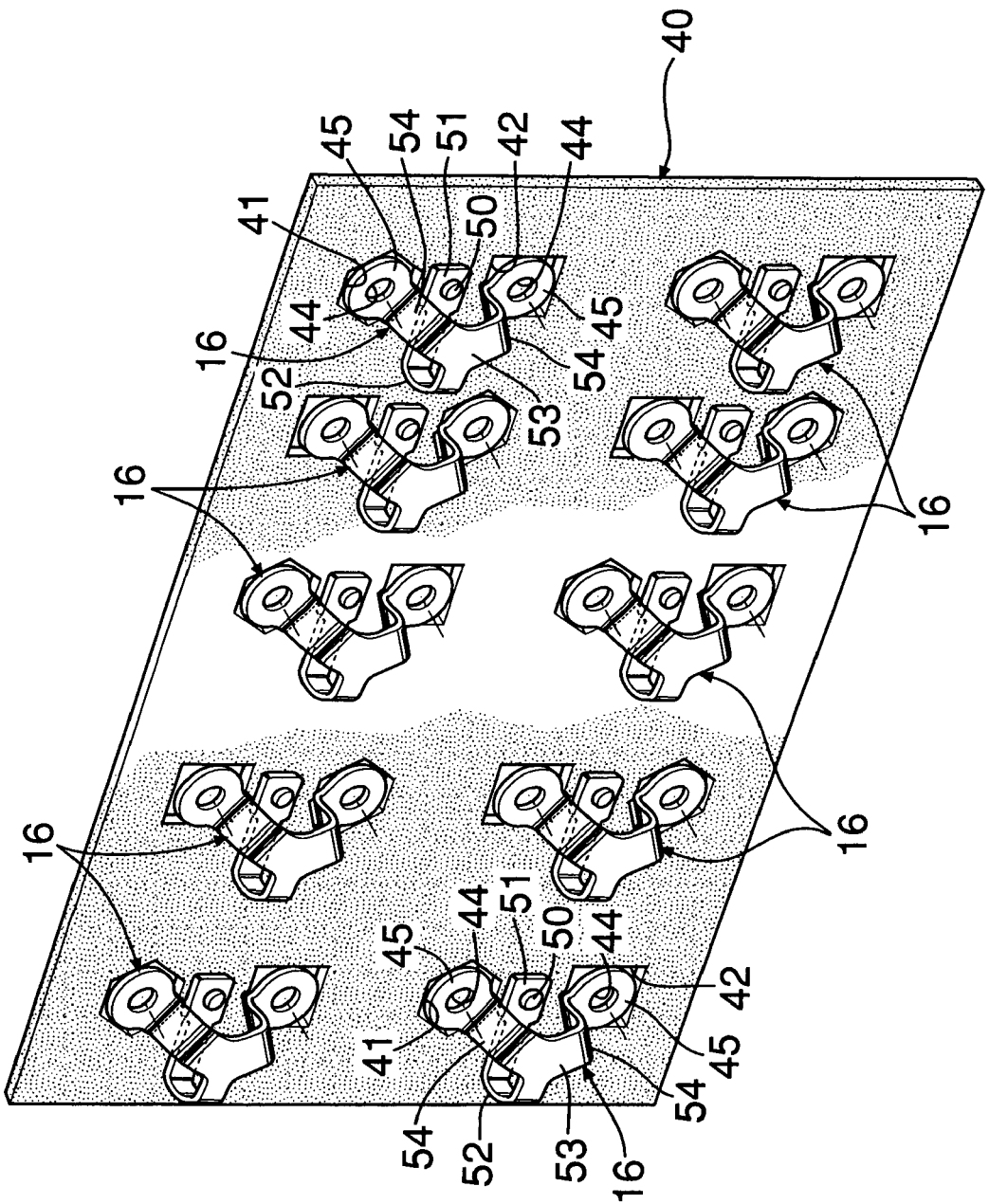
FIG. 6 is a perspective view of a second bus-bar plate.

As shown in FIGS. 3, 5, and 6, a first bus-bar plate 39 is disposed on one positive/negative electrode group side of the battery assembly 5, and a second bus-bar plate 40 is disposed on the other positive/negative electrode group side. The first and second bus-bar plates 39 and 40 have a plurality of hexagonal holes 41 and square holes 42 as through holes into which are fitted the hexagonal nut-shaped portions 33 and the square nut-shaped portions 37 of the positive and negative electrodes 7 and 8. In the first bus-bar plate 39 shown in FIG. 5, a plurality of first and second bus-bars 16, 43 having different shapes are mounted on a side opposite to the positive/negative electrode group. One annular connecting portion 45, which has a bolt hole 44, of each first bus-bar 16 faces the hexagonal hole 41, and another annular connecting portion 45, which has a bolt hole 44, similarly faces the square hole 42. Furthermore, one annular connecting portion 48, which has a bolt hole 47, of each second bus-bar 43 faces one of the hexagonal hole 41 and the square hole 42. In the second bus-bar plate 40 shown in FIG. 6, a plurality of first bus-bars 16 having the same type of shape as above are mounted on a side opposite to the positive/negative electrode group. One annular connecting portion 45, which has a bolt hole 44, of each first bus-bar 16 faces the hexagonal hole 41, and another annular connecting portion 45, which has a bolt hole 44, similarly faces one of the square holes 42.

Insulating bolts 49, which are made of a glass fiber-reinforced synthetic resin in the embodiment, are inserted through the bolt holes 44 of the two annular connecting portions 45 of each first bus-bar 16, and screwed into the threaded holes 34 and 38 of the positive and negative electrodes 7 and 8, thereby providing electrical connections between the plurality of sets of the positive electrode 7 and the negative electrode 8 via the plurality of first bus-bars 16.

The same kind of bolt 49 as above is inserted through the bolt hole 47 of the annular connecting portion 48 of each second bus-bar 43, and screwed into either the threaded hole 34 or 38 of the positive electrode 7 or the negative electrode 8, thereby providing electrical connections between the plurality of positive electrodes 7 and negative electrodes 8 and the plurality of second bus-bars 43.

As described above, when the first and second bus-bar plates 39 and 40 have the plurality of hexagonal holes 41 and the plurality of square holes 42 formed therein, the hexagonal holes 41 having fitted thereinto the hexagonal nut-shaped portions 33 of the plurality of positive electrodes 7 and the square holes 42 having fitted thereinto the square nut-shaped portions 37 of the plurality of negative electrodes 8, an erroneous combination of the battery modules 9 in the battery assembly 5 can be easily found.

Figure 7:
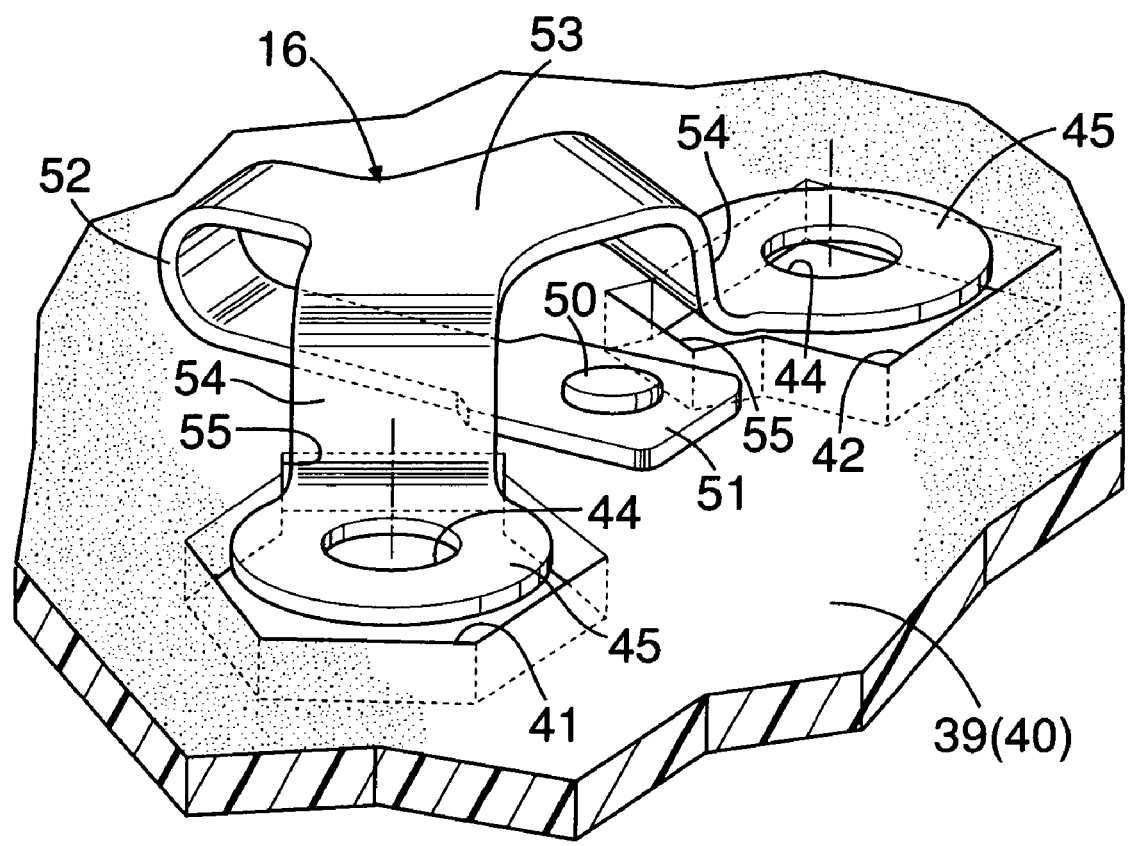
FIG. 7 is a perspective view of a first bus-bar.

As clearly shown in FIG. 7, the first bus-bar 16 is made of steel plate and is formed from a mounting portion 51, a bifurcated portion 53, and two bridge portions 54. One end of the mounting portion 51 is joined to the first or second bus-bar plate 39 or 40 via a rivet 50. The bifurcated portion 53 is connected to the other end of the mounting portion 51 via a U-shaped bent portion 52 so as to face the mounting portion 51. The bridge portions 54 are each connected to one of two ends of the bifurcated portion 53 and bent toward the mounting portion 51. The two annular connecting portions 45 are connected to the respective two bridge portions 54 so as to be positioned on the same plane as that in which the mounting portion 51 lies. In order to avoid interference of the sections where the bridge portions 54 and the annular connecting portions 45 are connected together with the first and second bus-bar plates 39 and 40, notches 55 connected to the hexagonal holes 41 and the square holes 42 are formed in the bus-bar plates 39 and 40 in areas facing the connecting sections. Each annular connecting portion 45 can thereby move toward or away from the positive or negative electrode 7 or 8, that is, the hexagonal nut-shaped portion 33 or the square nut-shaped portion 37, via the U-shaped bent portion 52, which is flexible. As a result, even if there are variations in the axial length of the battery modules 9, they can be easily accommodated, thereby reliably providing connections between the two annular connecting portions 45 and the positive and negative electrodes 7 and 8. The second bus-bar 43 is made of steel plate and has a mounting portion 56. One end of the mounting portion 56 is joined to the first bus-bar plate 39 via another rivet 50, and the other end thereof is connected to an annular connecting portion 48. In this case, the annular connecting portion 48 can move toward or away from the positive or negative electrode 7 or 8 due to flexibility of the mounting portion 56.

One of the plate-shaped members 11 is positioned at the connection between the endmost battery 6 at one end and its adjacent battery 6 of each battery module 9. The other plate-shaped member 11 is positioned at the connection between the endmost battery 6 at the other end and its adjacent battery 6 of each battery module 9.

Figure 8:
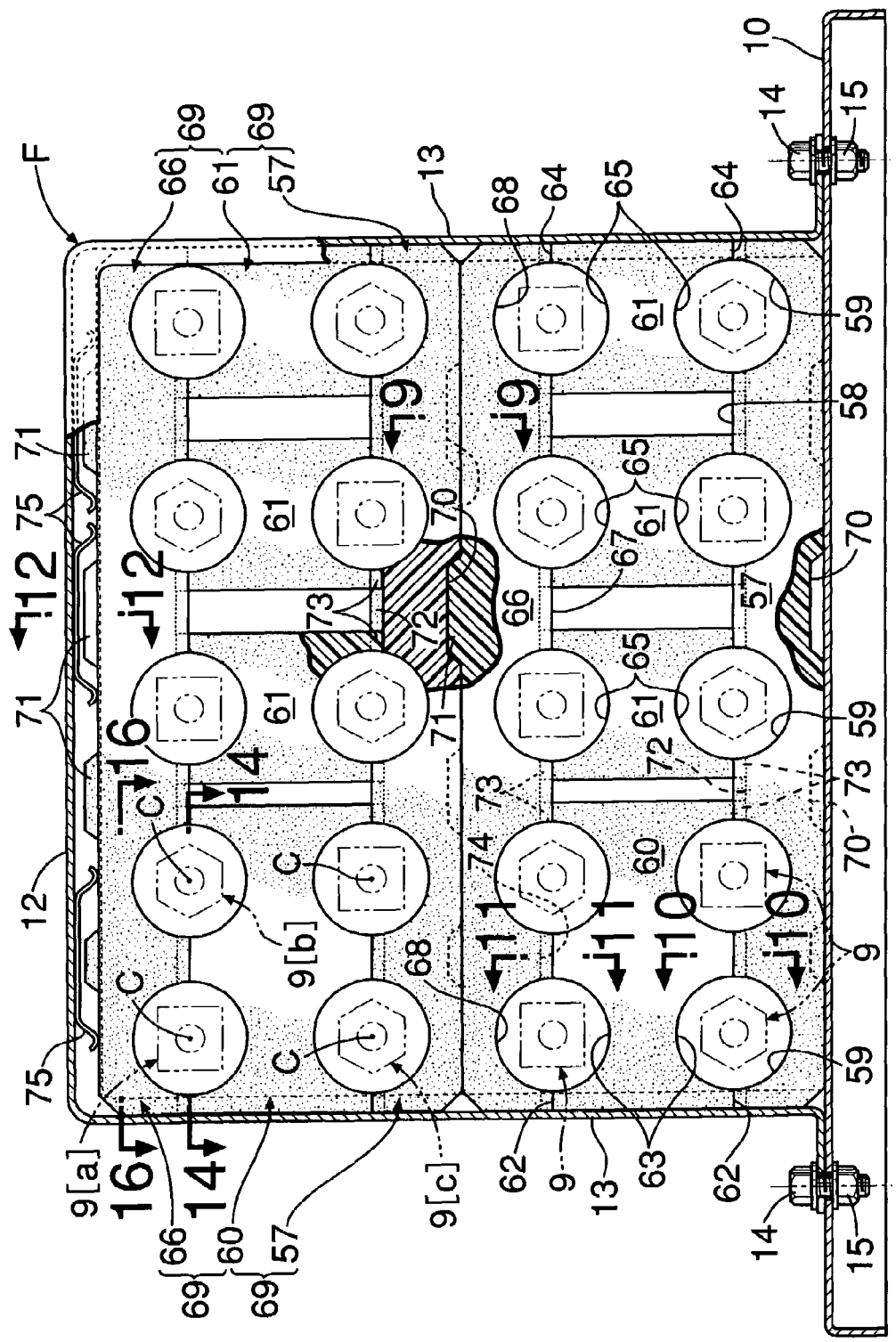
FIG. 8 is a cutaway side view of an essential part showing the relationship of a plate-shaped member to a frame member and a base plate.

Each of the plate-shaped members 11 has an identical structure and is an assembly of a plurality of synthetic resin grommets formed from two split halves as shown in FIG. 8. In the embodiment, a long first half 57 is disposed on the base plate 10 and has five semi-annular recesses 59 opening on an upward-facing split surface 58 of the first half 57, the outer peripheral surfaces of the insulating rings 27 of the five battery modules 9 in the bottom row being fitted into the recesses 59. Placed on top of the first half 57 are one second half 60 and three third halves 61. The second half 60 has two semi-annular recesses 63 opening on a downward-facing split surface 62 thereof, the outer peripheral surfaces of the insulating rings 27 of two of the battery modules 9 in the bottom row being fitted into the recesses 63. Each of the third halves 61 has one semi-annular recess 65 opening on a downward-facing split surface 64 thereof, the outer peripheral surface of the insulating ring 27 of one of the battery modules 9 in the bottom row being fitted into the recess 65. In this way, the five battery modules at the bottom are retained by the first half 57 and the second and third halves 60 and 61, which are in a split-in-two relationship with the first half 57.

The second half 60 has two semi-annular recesses 63 opening on an upward-facing split surface 62 thereof, the outer peripheral surfaces of the insulating rings 27 of two of the battery modules 9 in a row second from the bottom being fitted into the recesses 63. Similarly, each of the third halves 61 has a semi-annular recess 65 opening on an upward-facing split surface 64 thereof, the outer peripheral surface of the insulating ring 27 of one of the battery modules 9 in the second row from the bottom being fitted into the recess 65. Placed on top of the second and third halves 60 and 61 is a long fourth half 66, which has five semi-annular recesses 68 opening on a downward-facing split surface 67 thereof, the outer peripheral surfaces of the insulating rings 27 of the five battery modules 9 in the second row from the bottom being fitted into the recesses. In this way, the five battery modules 9 in the row second from the bottom are retained by the second and third halves 60 and 61 and the fourth half 66, which is in a split-in-two relationship with the second and third halves 60 and 61.

Similarly, another first half 57 is placed on top of the fourth half 66, another second half 60 and three third halves 61 are placed on top of the first half 57, and another fourth half 66 is placed on top of these second and third halves 60 and 61. In this way, the five battery modules 9 in a third row from the bottom are retained by the first half 57 and the second and third halves 60 and 61, which are in a split-in-two relationship with the first half 57, and the five battery modules 9 in the top row are retained by the second and third halves 60 and 61 and the fourth half 66, which is in a split-in-two relationship with the second and third halves 60 and 61.

In the embodiment, the first and fourth halves 57 and 66 are used in common, and the first and second halves 57 and 60, the first and third halves 57 and 61, the fourth and second halves 66 and 60, and the fourth and third halves 66 and 61 each form one grommet 69. It is also possible to use a grommet such as one formed from two halves having one semi-annular recess on a split surface.

Figure 9:
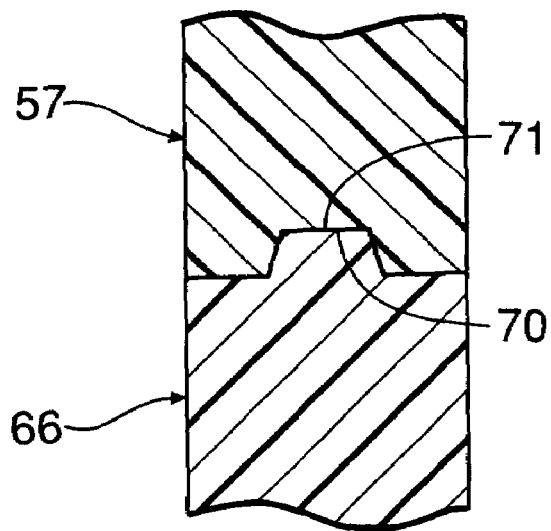
FIG. 9 is a cross section along line 9—9 in FIG. 8.

As shown in FIG. 9, a plurality of small recesses 70 are formed on the underside of the first half 57, the recesses 70 extending in a direction that intersects the axes of the battery modules 9, and a plurality of projections 71 corresponding to these small recesses 70 are formed on the upper side of the fourth half 66. Fitting each projection 71 into each small recess 70 for the first and fourth halves 57, 66 at a vertically midway position enables the plurality of grommets 69 on the upper side to be positioned relative to the plurality of grommets 69 on the lower side.

Figure 10:
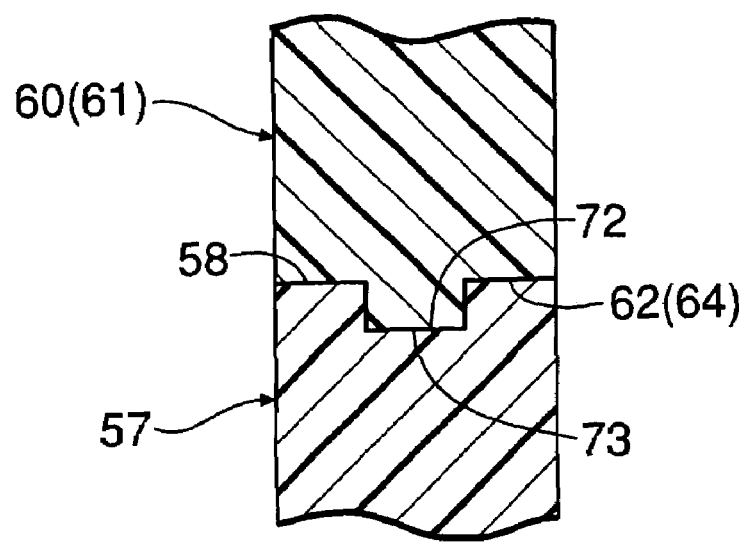
FIG. 10 is a cross section along line 10—10 in FIG. 8.
Figure 11:
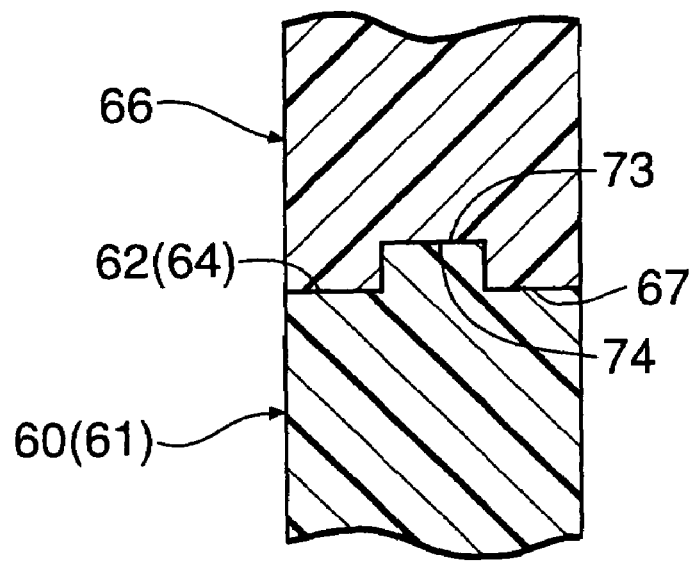
FIG. 11 is a cross section along line 11—11 in FIG. 8.

As shown in FIG. 10, a small recess 72 is formed along the whole of the upward-facing split surface 58 of the first half 57, the recess 72 extending in a direction intersecting the axes of the battery modules 9, and a projection 73 corresponding to the small recess 72 is formed along the whole of the downward-facing split surfaces 62 and 64 of each of the second and third halves 60 and 61. As is also shown in FIG. 11, a small recess 74 is formed along the whole of the downward-facing split surface 67 of the fourth half 66, the recess 74 extending in a direction intersecting the axes of the battery modules 9, and another projection 73 corresponding to the small recess 74 is formed along the whole of the upward-facing split surfaces 62 and 64 of each of the second and third halves 60 and 61. Interlocking this small recess 72 with the projections 73 and this small recess 74 with the projections 73 enables the first half 57 to be positioned relative to the second and third halves 60 and 61 in the axial direction of the battery modules 9, and the second and third halves 60 and 61 to be positioned relative to the fourth half 66 in the axial direction of the battery modules 9.

Figure 12:
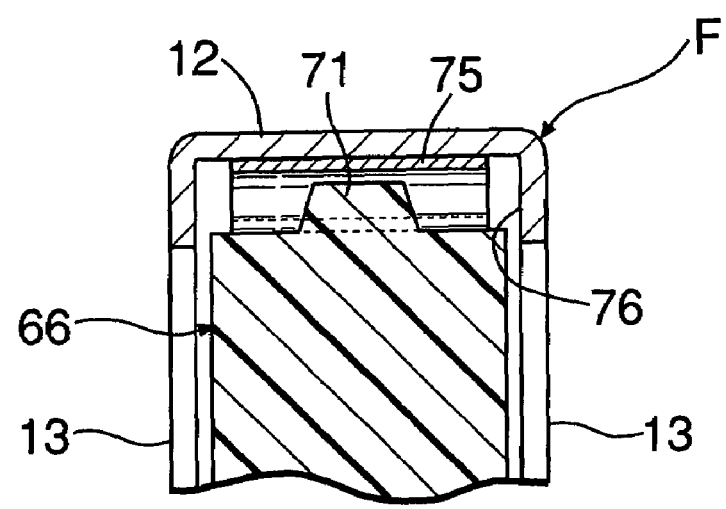
FIG. 12 is a cross section along line 12—12 in FIG. 8.

A plurality of leaf springs 75 are disposed between the upper side of the fourth half 66 on the top and the upper linking portion 12 of the frame member F, and the resilient forces of the leaf springs 75 press the plurality of grommets 69, and thus the plate-shaped member 11, onto the base plate 10. As shown in FIG. 12, the frame member F has a channel-shaped cross section such that a channel 76 is positioned inside the gantry shape, and each leaf spring 75 is housed and retained within the channel 76 in the upper linking portion 12.

Figure 13:
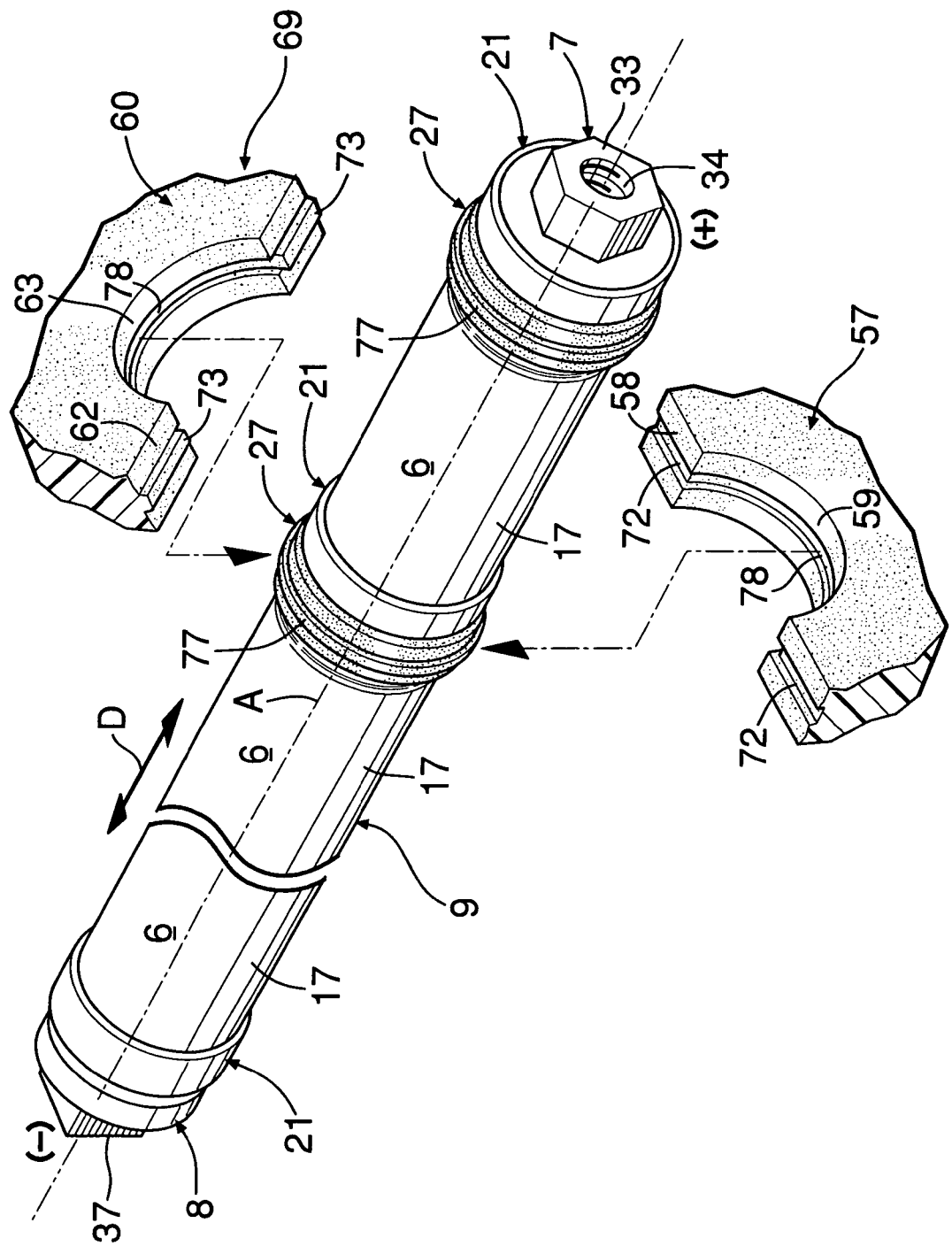
FIG. 13 is a perspective view showing the relationship between a grommet and an insulating ring of the battery module.

As shown in FIG. 13, a recess and a corresponding projection are formed on the two halves forming each grommet 69, that is, in the embodiment, an annular projection 77 is formed on the outer peripheral surface of each insulating ring 27, and a semi-annular recess 78 is formed on the inner peripheral surface of the two semi-annular recesses 59 and 63 of the first and second halves 57 and 60, etc., the outer peripheral surface of the insulating ring 27 being fitted into the inner peripheral surfaces of the two semi-annular recesses 59 and 63. Interlocking the annular projection 77 with the two semi-annular recesses 78 enables the grommet 69 to be easily positioned relative to the battery module 9. It is also possible to use the insulating ring 27 having the annular projection 77 as an insulating ring at a position that does not correspond to the grommet 69.

Figure 14:
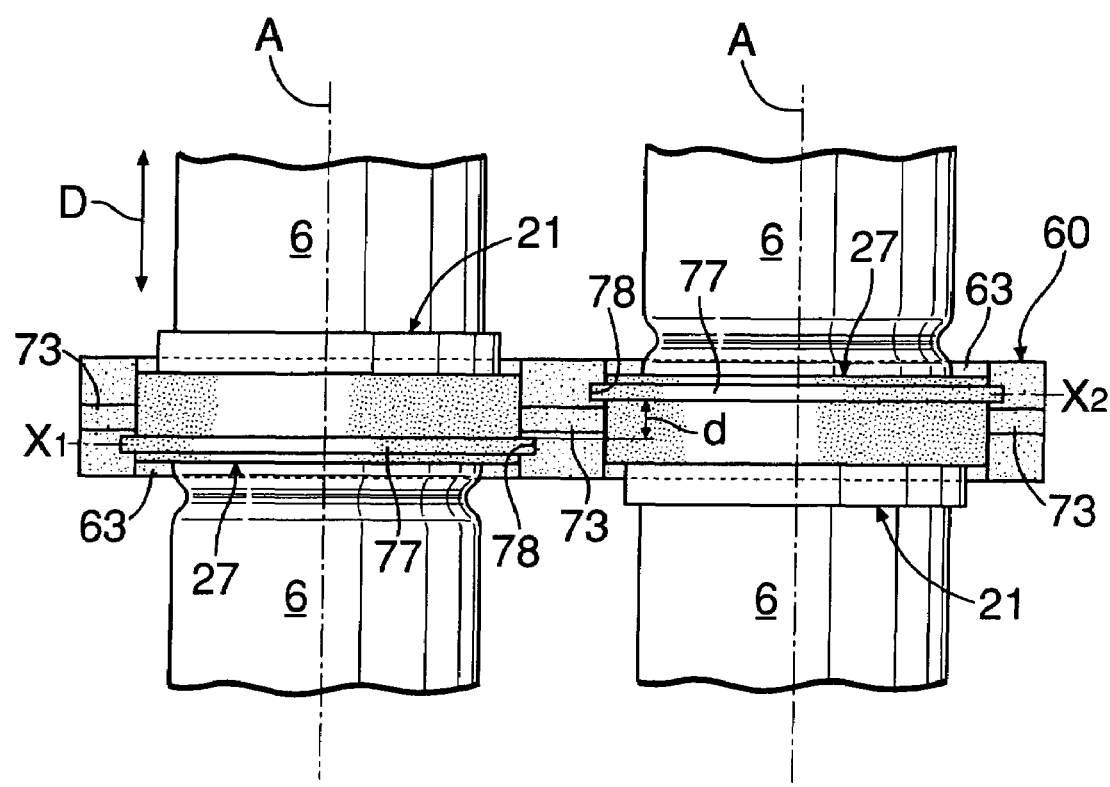
FIG. 14 is a perspective view, corresponding to a view from arrow 14—14 in FIG. 8, showing the relationship between a grommet and an insulating ring of the battery module.
Figure 15:
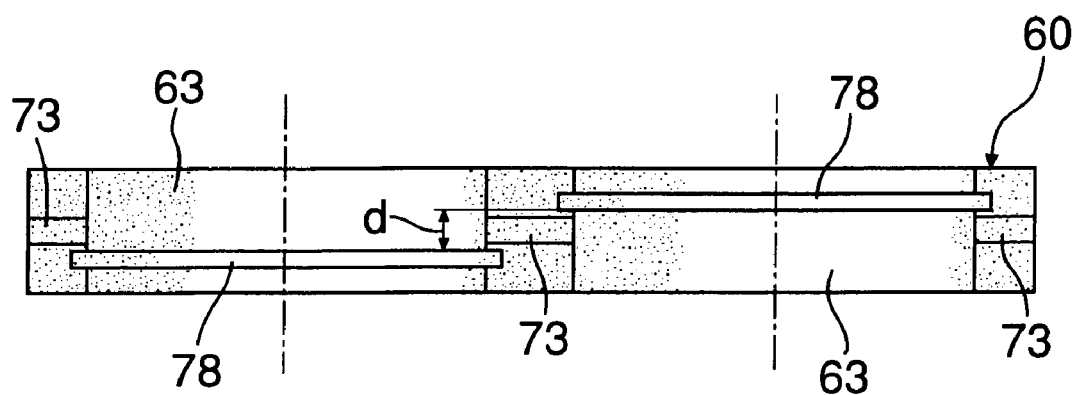
FIG. 15 is a plan view of a second half, corresponding to a view from arrow 14—14 in FIG. 8.
Figure 16:
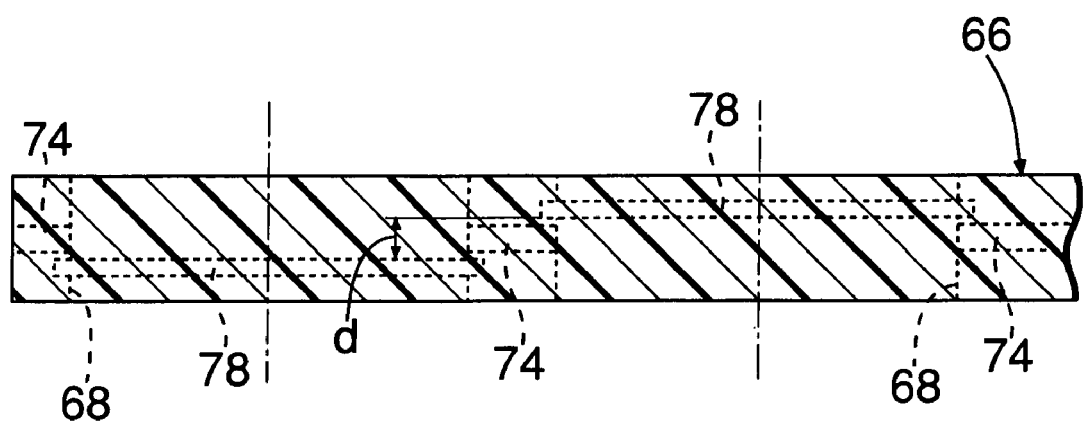
FIG. 16 is a cross section of a fourth half, corresponding to a cross section along line 16—16 in FIG. 8.

As shown in FIGS. 14 to 16, a recess and a corresponding projection are formed on the two halves forming each grommet 69, that is, in the embodiment, the annular projection 77 is formed on the outer peripheral surface of each insulating ring 27, and the semi-annular recess 78 is formed on the inner peripheral surface of the two semi-annular recesses 63 and 68 of the second and fourth halves 60 and 66, etc., the outer peripheral surface of the insulating ring 27 being fitted into the inner peripheral surfaces of the two semi-annular recesses 63 and 68. In this case, a position $X_1$ where the projection and the recess 77 and 78 are interlocked on one of two adjacent battery modules 9 is displaced only by a distance d in the axial direction D of the battery modules from a position $X_2$ where the projection and the recess 77 and 78 are interlocked on the other battery module 9.

In accordance with this arrangement, it is easy to position the grommets 69 relative to the battery modules 9. Furthermore, in FIG. 14, if the battery module 9 on the left-hand side is disposed on the right-hand side, then the positions of the positive electrode 7 and the negative electrode 8 of the battery module 9 are misaligned relative to the first and second bus-bar plates 39 and 40, so that the above-mentioned displaced structure for the positions $X_1$ and $X_2$ can therefore produce an effect in preventing an erroneous combination of the battery modules 9. In FIG. 1, etc., 80 denotes a terminal plate covering each of the bus-bar plates 39 and 40.

[Embodiment II]

Figure 17:
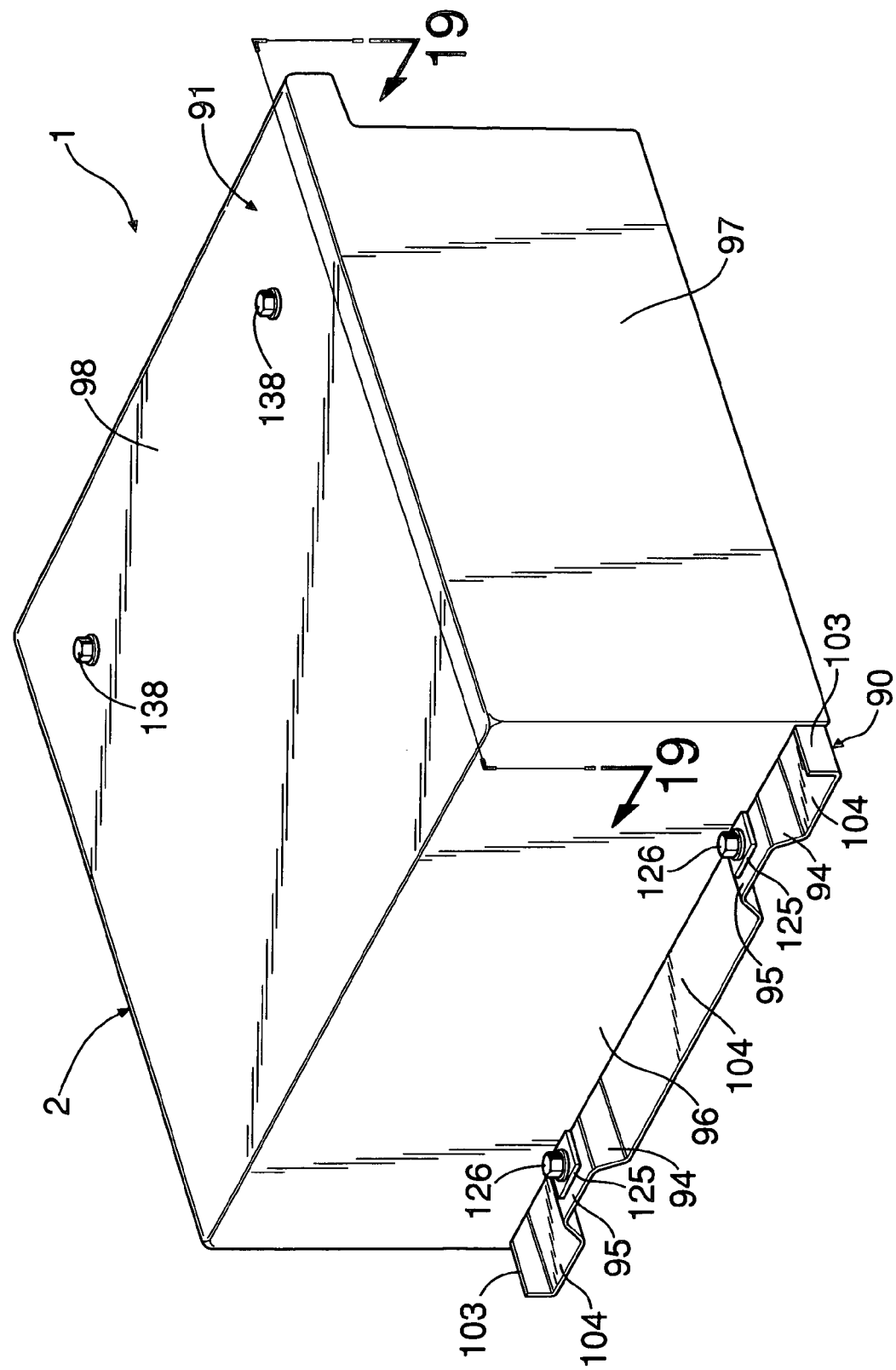
FIG. 17 is a perspective view of one example of a battery-type power supply unit in Embodiment II.
Figure 18:
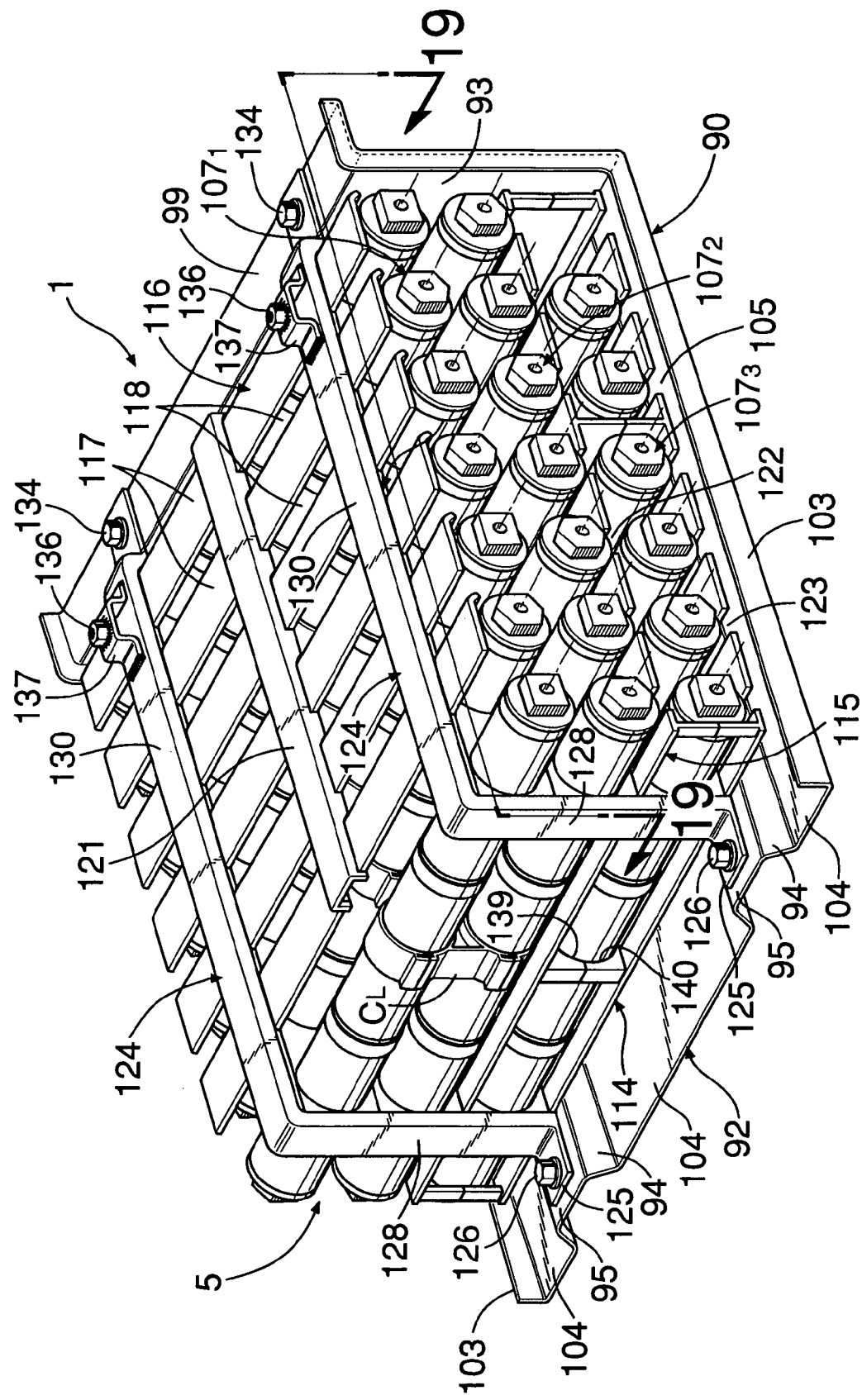
FIG. 18 is a perspective view showing the relationship between a battery assembly and a base, etc.

In FIGS. 17 and 18, a battery-type power supply unit 1 includes a substantially rectangular parallelepiped box 2 and a battery assembly 5 disposed within the box 2. The box 2 is formed from a steel base 90 and a synthetic resin (or metal) cover 91. The base 90 is formed from a support plate 92 and a shielding plate 93 rising from one edge of the support plate 92 and facing one side of the battery assembly 5. The battery assembly 5 is in the form of a substantially rectangular parallelepiped block and is placed on the support plate 92. The support plate 92 has two ridges 94 disposed at an interval, and each ridge 94 is formed orthogonal to the shielding plate 93 and has a flat top face 95. The height of each ridge 94 is smallest on the shielding plate 93 side and gradually increases with distance from the shielding plate 93. The base 90 is disposed such that the top face 95 of each ridge 94 is horizontal.

Figure 19:
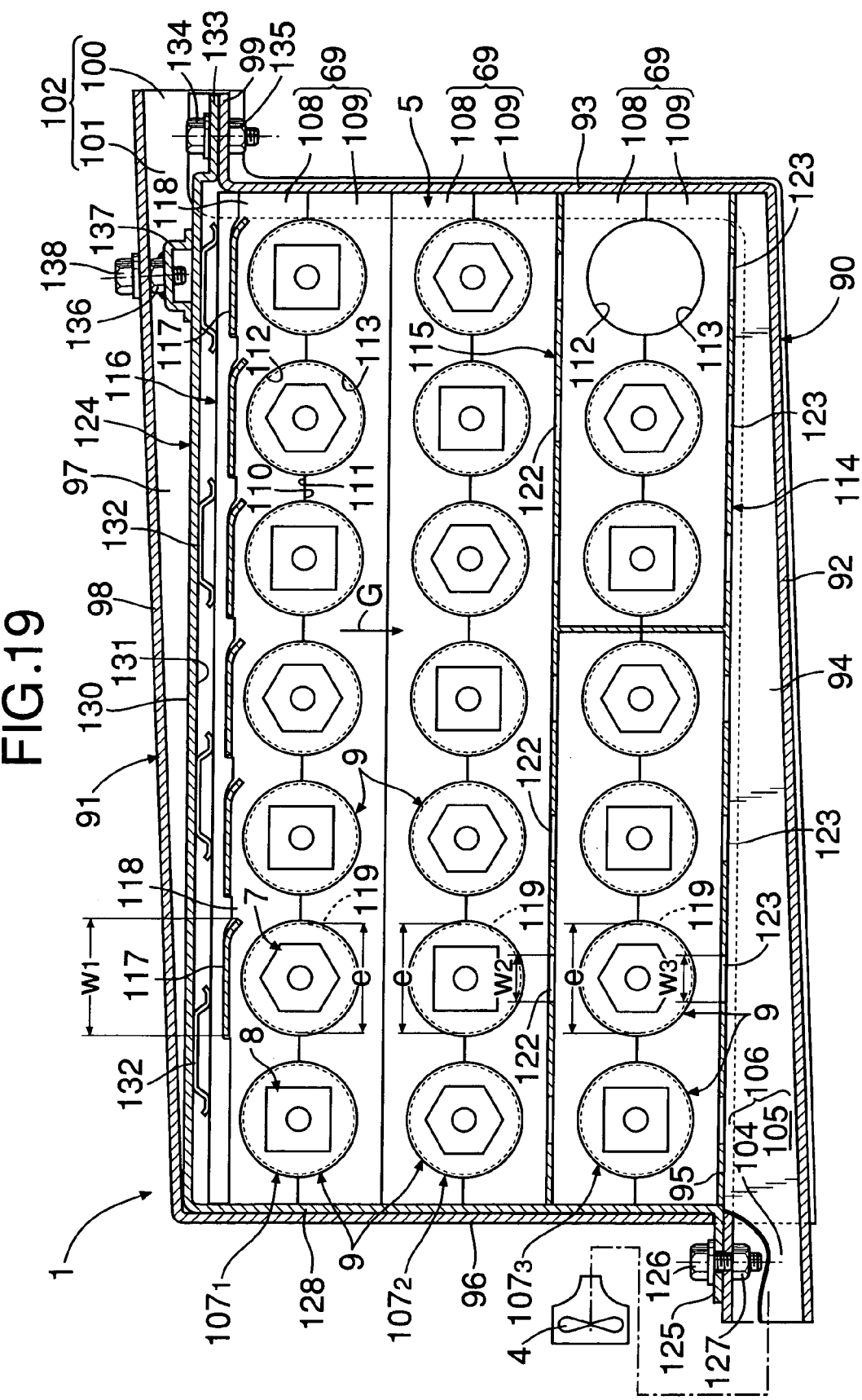
FIG. 19 is a cross section along line 19—19 in FIGS. 17 and 18.

As also shown in FIG. 19, three sides of the battery assembly 5, excluding the side facing the shielding plate 93, are covered by a side plate 96 that faces the shielding plate 93, and two opposing side plates 97 of the cover 91, and the upper side of the battery assembly 5 is covered by a top plate 98 of the cover 91.

Although one side of the cover 91 is open, the opening is blocked by the shielding plate 93 except for an upper part. An end of the top plate 98 on the shielding plate 93 side faces an upper edge plate 99 with a cooling air inlet 100 therebetween, the upper edge plate 99 extending outward from the upper edge of the shielding plate 93. The top plate 98 is sloped from the inlet 100 toward the side plate 96 that faces the shielding plate 93 such that the gap between the top plate 98 and the battery assembly 5 gradually decreases, and this wedge-shaped space functions as a cooling air passage 101. The inlet 100 and the passage 101 therefore form a cooling air infeed part 102.

On each of the two edges of the support plate 92, the shielding plate 93, and the upper edge plate 99, a series of bent edge portions 103 is formed so as to be bent upward with respect to the support plate 92. The inner faces of the two opposing side plates 97 of the cover 91 are in intimate contact with the outer faces of the two bent edge portions 103. The lower edge of the side plate 96 that faces to the shielding plate 93 abuts against the top face 95 of each ridge 94. In this way, three openings present outside the ridges 94 and between the two ridges 94 of the support plate 92 function as cooling air outlets 104, and three wedge-shaped spaces that are within the cover 91 and that communicate with these outlets 104 function as cooling air passages 105. These outlets 104 and passages 105 thus form a cooling air outfeed part 106. Each outlet 104 is connected to a suction fan 4 via a common duct (not illustrated).

In this way, since the cooling air infeed part 102 is present above the battery assembly 5 and the cooling air outfeed part 106 is present beneath the battery assembly 5, a flow G of cooling air within the battery assembly 5 is from top to bottom.

Figure 20:
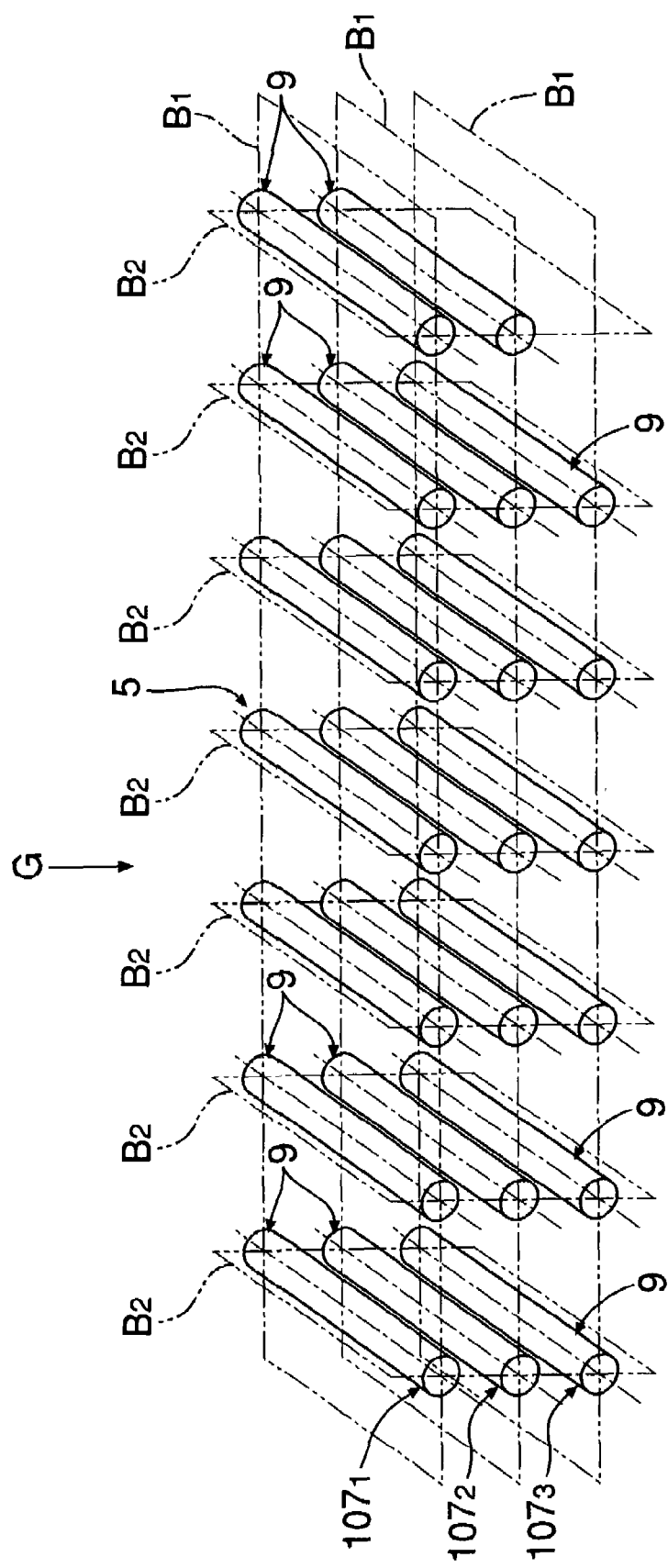
FIG. 20 is a perspective view for explaining the arrangement of rod-shaped battery modules.

As also shown in FIG. 20, the battery assembly 5 has three, that is, first to third battery module groups $107_1$ to $107_3$, which are arranged parallel to each other at intervals along the direction of flow G of the cooling air. Each battery module group $107_1$ to $107_3$ includes a plurality of rod-shaped battery modules 9 that are arranged at intervals such that the axes thereof intersect the direction of flow G of cooling air within an imaginary plane $B_1$ that intersects the direction of flow G of the cooling air. In this embodiment, the number of rod-shaped modules 9 is 7 for the first and second battery module groups $107_1$, $107_2$ and 6 for the third battery module group $107_3$. With regard to two rod-shaped battery modules that are adjacent along the direction of flow G of the cooling air, both axes of the battery modules are positioned within an imaginary plane $B_2$ that is parallel to the direction of flow G of the cooling air. The reason that the number of the rod-shaped battery modules 9 in the third battery module group $107_3$ is one less than the number in the other groups is because two rod-shaped battery modules 9 are connected to form one set and the number of the rod-shaped battery modules 9 is therefore made an even number.

Figure 21:
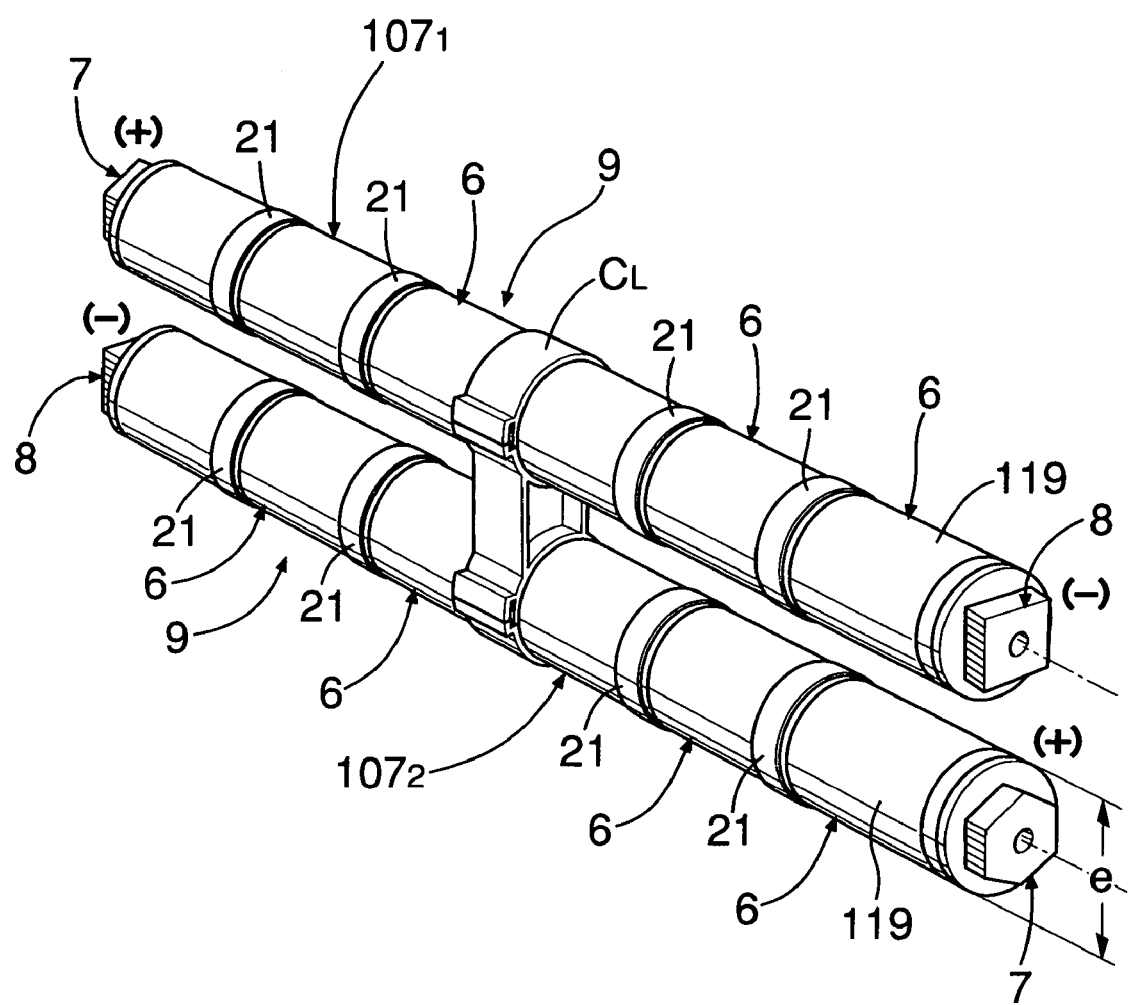
FIG. 21 is a perspective view of the rod-shaped battery modules.

As clearly shown in FIG. 21, each rod-shaped battery module 9 has a plurality, 6 in this embodiment, of batteries (secondary batteries) 6, two adjacent batteries 6 being connected together in series via a connecting ring 21. Each rod-shaped battery module 9 has at one end a positive electrode 7 having a hexagonal portion and at the other end a negative electrode 8 having a square portion.

Figure 22:
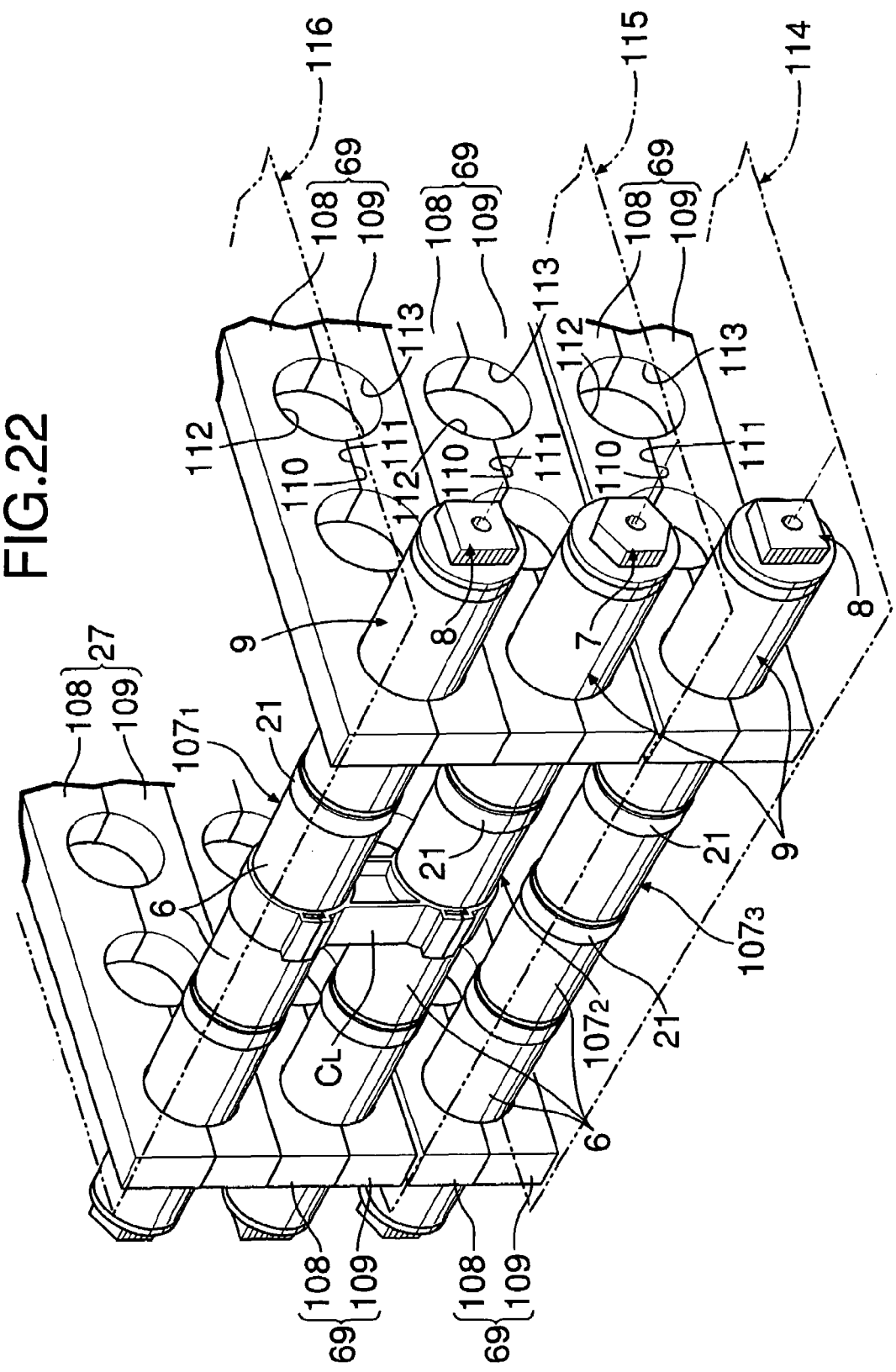
FIG. 22 is a perspective view of an essential part showing the relationship between the rod-shaped battery modules and grommets.

As shown in FIGS. 19 and 22, the 7 rod-shaped battery modules 9 of the first battery module group $107_1$ are supported by two synthetic resin angular rod-shaped grommets 69, which are disposed at two positions at a predetermined interval in the axial direction of the modules 9. Each grommet 69 is formed from an upper first half 108 and a lower second half 109. Formed on a joining face 110, 111 of each of the two halves 108, 109 are 7 semi-circular recesses 112, 113, into each of which the outer peripheral surface of the connecting ring 21 of the rod-shaped battery module 9 is fitted. The relationship between the second battery module group $107_2$ and the two grommets 69 is the same as for the first battery module group $107_1$. The 6 rod-shaped battery modules 9 of the third battery module group $107_3$ are retained by the two grommets 69 in the same manner as above, and there is no rod-shaped battery module 9 in a circular retaining hole formed by the two recesses 112, 113 adjacent to the shielding plate 93.

Figure 23:
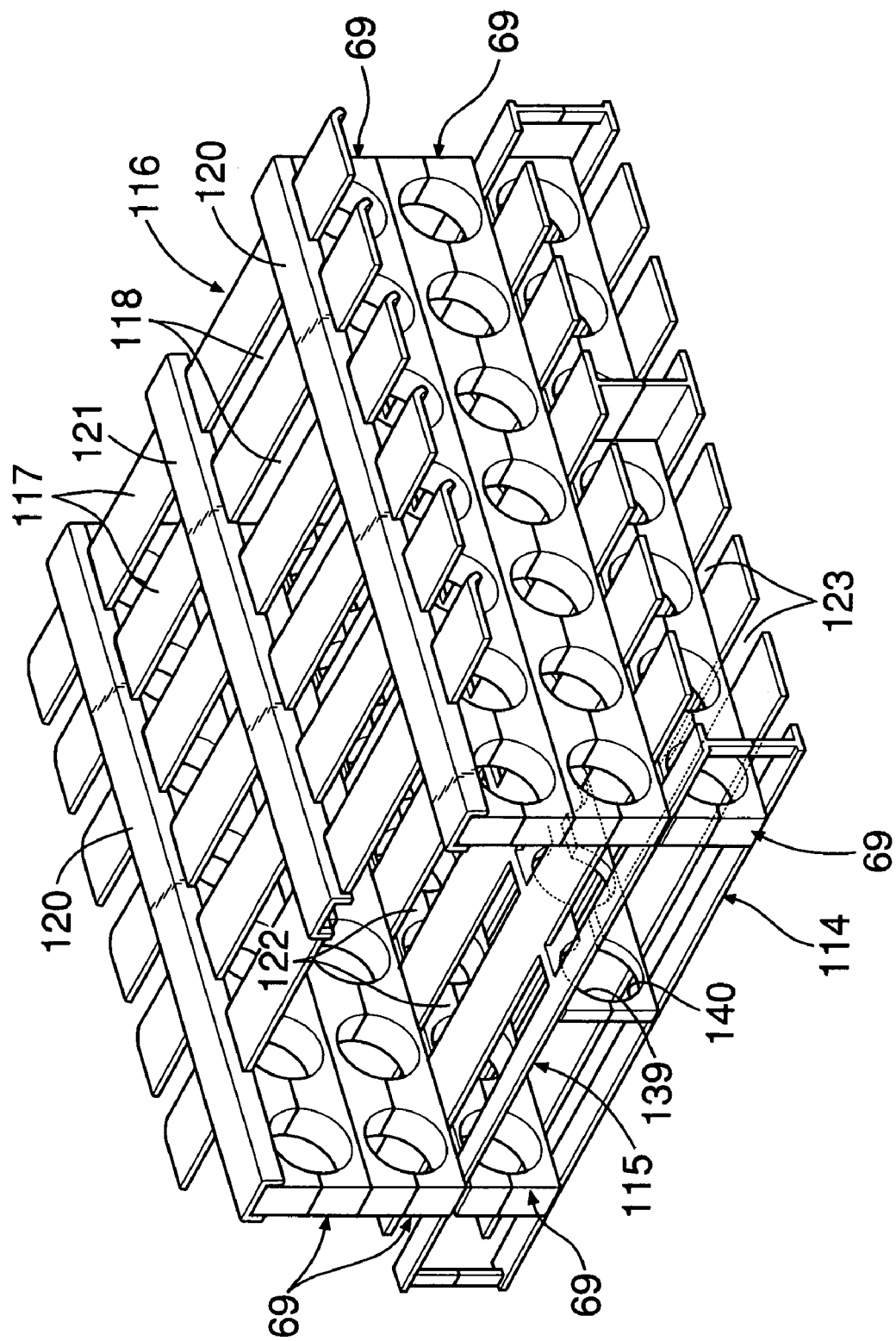
FIG. 23 is a perspective view showing the relationship between first to third rectifying plates and the grommets.

As shown in FIGS. 19 and 23, bridging between the top faces 95 of the two ridges 94 of the base 90 is a synthetic resin third rectifying plate 114, which has a planar shape smaller than that of the support plate 92 and a side in contact with the shielding plate 93. Each of the grommets 69 that retain the third battery module group $107_3$ is placed on top of the third rectifying plate 114 such that one side of the grommet 69 is in contact with the shielding plate 93 and the grommet 69 is positioned directly above the ridge 94. A synthetic resin second rectifying plate 115 having a shape that is the reverse of the shape of the third rectifying plate 114 bridges between the two grommets 69 such that one side edge of the second rectifying plate 115 is in contact with the shielding plate 93. Each of the grommets 69 that retain the second battery module group $107_2$ is placed on top of the second rectifying plate 115 such that one side of the grommet 69 is in contact with the shielding plate 93 and the grommet 69 is positioned directly above the grommet 69 of the third battery module group $107_3$. Each of the grommets 69 that retain the first battery module group $107_1$ is placed on this grommet 69 of the second battery module group $107_2$ such that one side thereof is in contact with the shielding plate 93. A first rectifying plate 116 made of a synthetic resin and having a shape different from that of the second and third rectifying plates 115, 114 bridges between the grommets 69 such that one side edge of the first rectifying plate 116 is in contact with the shielding plate 93. The lengths of the grommets 69 and the lengths of the first to third rectifying plates 116 to 114 in a direction intersecting the direction of flow G of the cooling air are identical.

In this way, the first rectifying plate 116 is disposed on the cooling air infeed part 102 side of the first battery module group $107_1$, which is the closest to the cooling air infeed part 102. The second rectifying plate 115 is placed disposed the second and third battery module groups $107_2$ and $107_3$. The third rectifying plate 114 is disposed on the cooling air outfeed part 106 side of the third battery module group $107_3$.

The first rectifying plate 116 is formed from a plurality, 6 in the embodiment, of strip-shaped portions 117 and a plurality, 5 in the embodiment, of slits 118. The strip-shaped portions 117 extend in the axial direction of the plurality, 6 in the embodiment, of rod-shaped battery modules 9 from the inlet 100 side of the first battery module group $107_1$ and face those rod-shaped battery modules 9 across a gap. The slits 118 are present between two adjacent strip-shaped portions 117 and face a space between two adjacent battery modules 9. The slit 118 corresponding to the rod-shaped battery module 9 at the position closest to the inlet 100 is formed between the strip-shaped portion 117 and the shielding plate 93. There is no strip-shaped portion 117 provided for the rod-shaped battery module 9 at the position furthest from the inlet 100.

Figure 24:
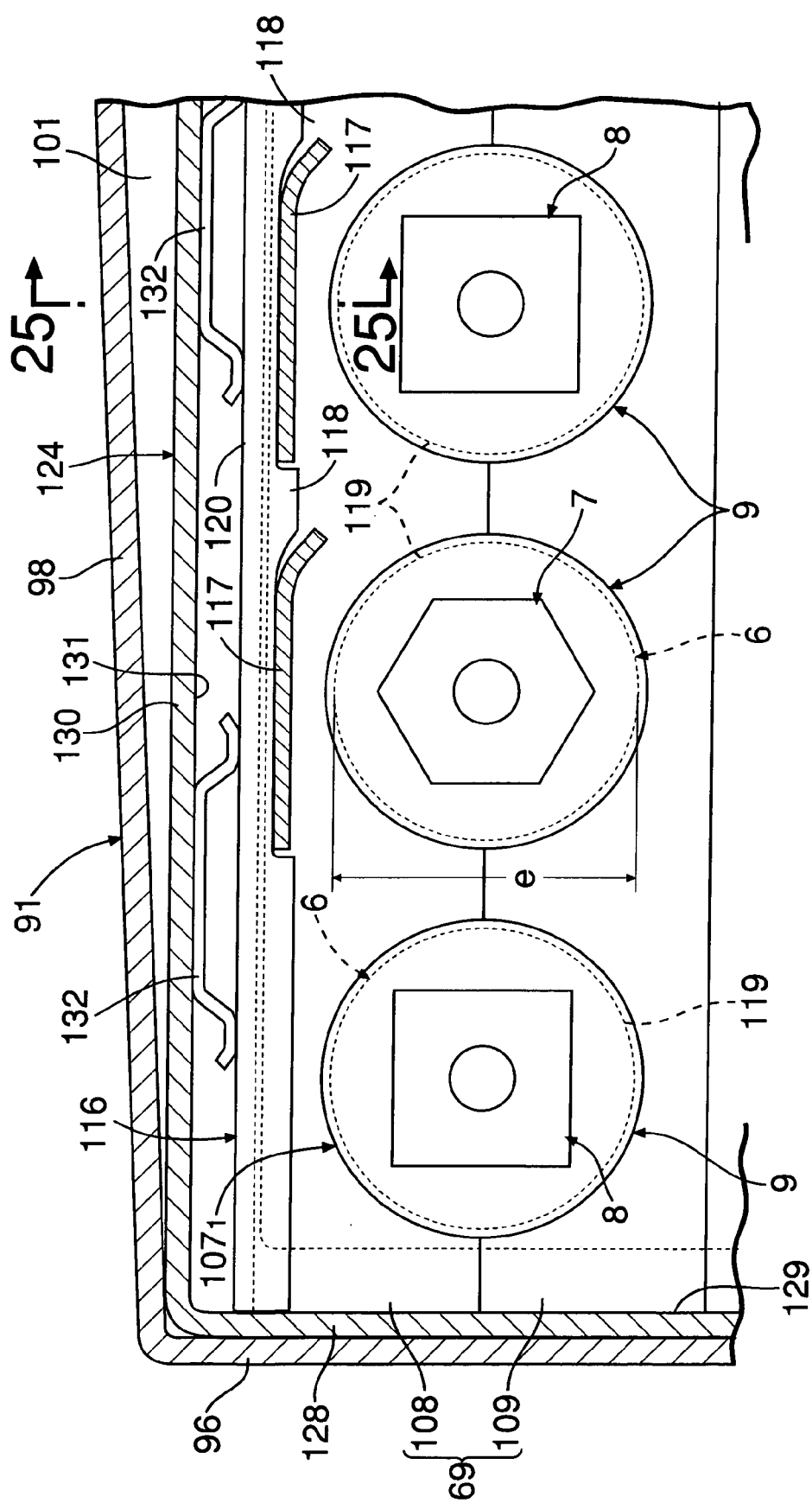
FIG. 24 is a magnified view of an essential part of FIG. 19.

With regard to the first rectifying plate 116 and the first battery module group $107_1$, the relationship $w_1 \geq e$ is satisfied where e is the outer diameter of the rod-shaped battery module 9 and $w_1$ is the width of the strip-shaped portion 117 corresponding to the outer diameter e. The outer diameter e of the rod-shaped battery module 9 referred to here denotes the outer diameter of a bottomed cylinder 119 on the negative electrode side of the battery 6 as shown in FIGS. 21 and 24. The same applies below.

In the first rectifying plate 116, a portion facing each grommet 69 is formed from a downwardly opening shallow channel material 120, and the corresponding grommets 69 are fitted into the channel materials 120. The strip-shaped portion 117 is divided into four in the axial direction of the rod-shaped battery modules 9. A first divided piece has one of its ends joined to one side of one of the channel materials 120. A second divided piece has its two ends joined respectively to the other side of said one of the channel materials 120 and one side of a short channel material 121 adjacent thereto. A third divided piece is joined to the other side of the short channel material 121 and one side of the other channel material 120. A fourth divided piece has one of its ends joined to the other side of said other channel material 120.

The second rectifying plate 115 has a plurality, 7 in the embodiment, of slits 122 that face the outer peripheral surface of the corresponding rod-shaped battery modules 9 of each of the second and third battery module groups $107_2$, $107_3$, extend in the axial direction of the rod-shaped battery module 9, and are partitioned partway along. Furthermore, the relationship $e > w_2$ is satisfied, where e is the outer diameter of the rod-shaped battery module 9 and $w_2$ is the width of the slit 122 corresponding to the outer diameter e.

The third rectifying plate 114 has a plurality, 7 in the embodiment, of slits 123 that face the outer peripheral surface of the corresponding rod-shaped battery modules 9 of the third battery module group $107_3$, extend in the axial direction of the rod-shaped battery module 9, and are partitioned partway along. There is no rod-shaped battery module 9 corresponding to the slit 123 at the position closest to the inlet 100. Furthermore, the relationship $e > w_3$ is satisfied, where e is the outer diameter of the rod-shaped battery module 9 and $w_3$ is the width of the slit 123 corresponding to the outer diameter e.

Figure 25:
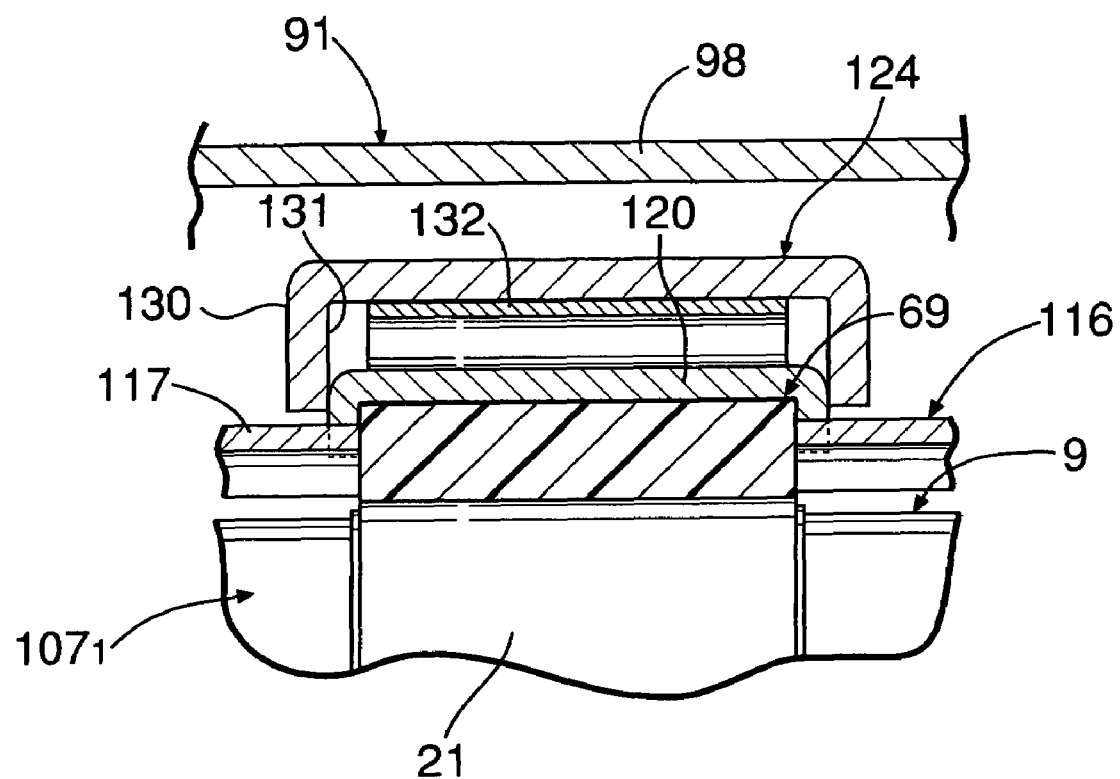
FIG. 25 is a cross section along line 25—25 in FIG. 24.

As shown in FIGS. 18 and 19, two steel frame members 124 each has a mounting part 125 at one end, and the mounting part 125 is secured by means of a bolt 126 and a nut 127 to a top face 95 of one of the two ridges 94 at one end on the side opposite to the shielding plate 93. As shown in FIG. 24, a vertical portion 128 rising from each mounting part 125 has a channel shape, and the side of each grommet 69 is fitted into this channel 129. As also shown in FIG. 25, a horizontal portion 130 bending and extending from each vertical portion 128 also has a channel shape, this channel 131 covering the channel material 120 of the first rectifying plate 116, and a plurality of leaf springs 132 are disposed between the horizontal portion 130 and the channel material 120. The resilient forces of these leaf springs 132 press the first to third rectifying plates 116 to 114 and the three grommets 69 onto the support plate 92. Each horizontal portion 130 has a mounting portion 133 connected to an end thereof, and this mounting portion 133 is placed on and secured by means of a bolt 134 and a nut 135 to the upper edge plate 99 connected to the shielding plate 93.

A support member 137 having a nut 136 on the upper surface thereof is provided on the upper surface in an end part, on the inlet 100 side, of the horizontal portion 130 of each frame member 124. The top plate 98 of the cover 91 is placed on the nut 136, and a bolt 138 running through the top plate 98 is screwed into the nut 136. By so doing, the cover 91 is mounted on each frame member 124. Another mounting means for the cover 91 is also provided, but this is omitted in the figures.

As shown in FIGS. 18, 21, and 22, each rod-shaped battery module 9 of the first battery module group $107_1$ and its adjacent rod-shaped battery module 9 of the second battery module group $107_2$ are coupled by a synthetic resin clip $C_L$ at a position of the connecting ring 21 that is present in a middle section in the axial direction of the modules 9. As shown in FIGS. 18 and 23, each rod-shaped battery module 9 of the third battery module group $107_3$ is held tightly between opposing semi-circular recesses 139, 140 provided on the second and third rectifying plates 115, 114 at the position of the connecting ring 21 that is present in the middle section in the axial direction of the module 9. In this way, vibration of each rod-shaped battery module 9 in the first to third battery module groups $107_1$ to $107_3$ is suppressed.

In FIG. 19, when cooling the battery assembly 5, operating the suction fan 4 allows cooling air to circulate from the inlet 100 to the passage 101, the interior of the battery assembly 5, the passage 105, and the exit 104 in that order.

Figure 26:
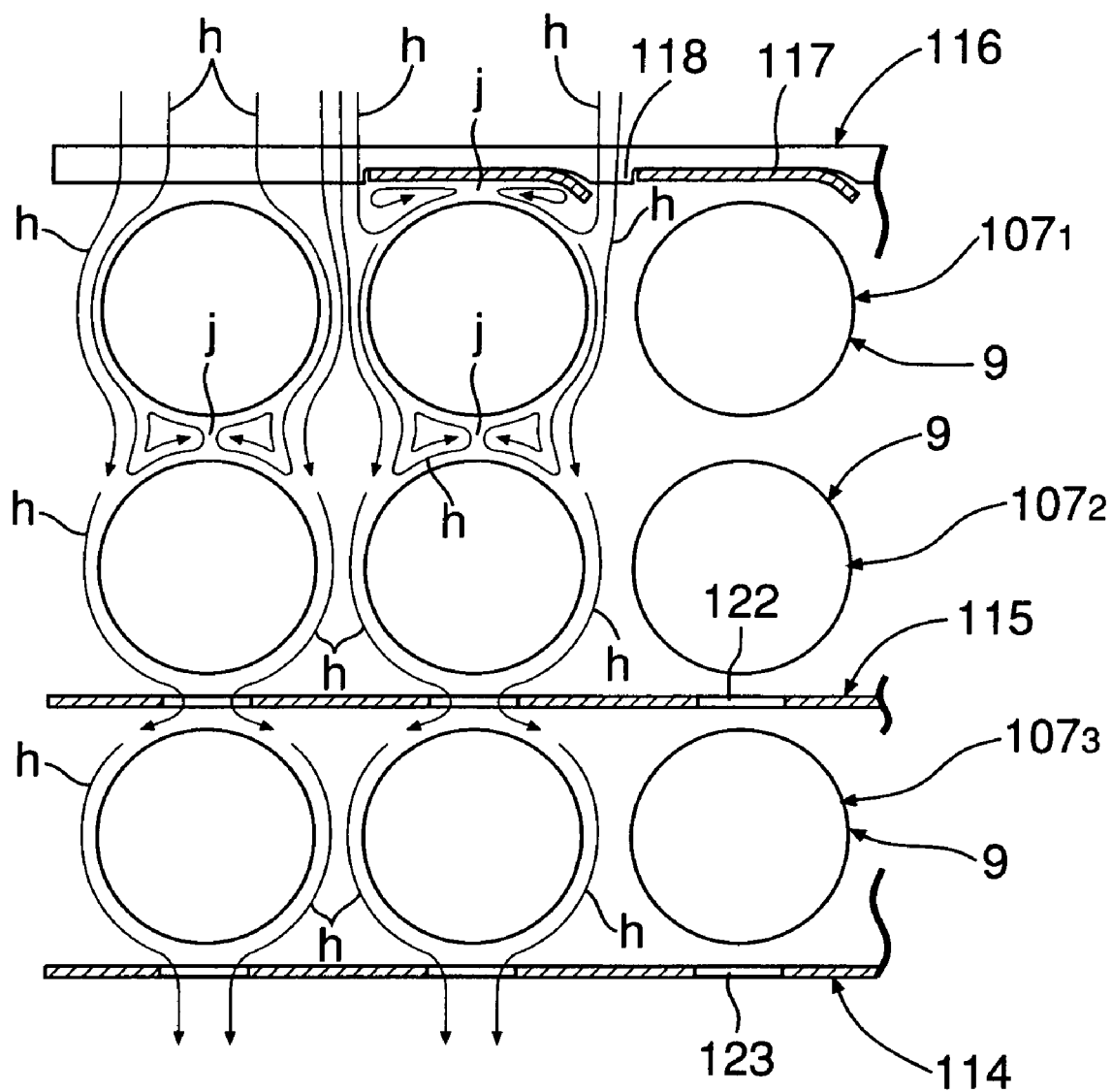
FIG. 26 is an explanatory view showing the relationship between the first to third rectifying plates and rod-shaped battery modules and the flow of cooling air.

As shown by arrows in FIG. 26, when cooling air h circulates through each slit 118 of the first rectifying plate 116 and between two adjacent battery modules 9 of the first and second battery module groups $107_1$, $107_2$, an area i of low cooling air flow where the cooling performance is poor is formed between the strip-shaped portion 117 and substantially one quarter of the outer peripheral surface of the rod-shaped battery module 9 facing the strip-shaped portion 117, and another area i of low cooling air flow where the cooling performance is poor is formed between substantially one quarter, on the lower side, of the outer peripheral surface of the rod-shaped battery module 9 of the first battery module group $107_1$ and substantially one quarter, on the upper side, of the outer peripheral surface of the rod-shaped battery module 9 that is beneath and adjacent to the above battery module 9. In this way, six of the rod-shaped battery modules 9 forming the first battery module group $107_1$ are cooled by exposure of substantially two quarters of the outer peripheral surface of each of the modules 9 to the cooling air h flowing past both sides thereof. Since in the first battery module group $107_1$ the rod-shaped battery module 9 that has no corresponding strip-shaped portion 117 is positioned furthest from the inlet 100 and the amount of cooling air there is small, approximately three quarters of the outer peripheral surface, excluding a portion facing an area j of low cooling air flow formed beneath the module 9, is exposed to the cooling air h.

All the rod-shaped battery modules 9 forming the second battery module group $107_2$ are cooled by exposure of substantially three quarters of the outer peripheral surface of each of the modules 9 to the cooling air h flowing by on both sides thereof and flowing into the slits 122 of the second rectifying plate 115.

Six of the rod-shaped battery modules 9 forming the third battery module group $107_3$ are cooled by exposure of the entire outer peripheral surface of each of the modules 9 to the cooling air h flowing past the slits 122 of the second rectifying plate 115, along the outer peripheral surface of the rod-shape battery modules 9, and finally into the slits 123 of the third rectifying plate 114.

Although the cooling bility of the cooling air h deteriorates while traveling from the first battery module group $107_1$ to the second battery module group $107_2$ and further to the third battery module group $107_3$, since the area of the rod-shaped battery modules 9 that are exposed to the cooling air h increases accordingly, all the rod-shaped battery modules 9 can be cooled substantially equally.

Figure 27:
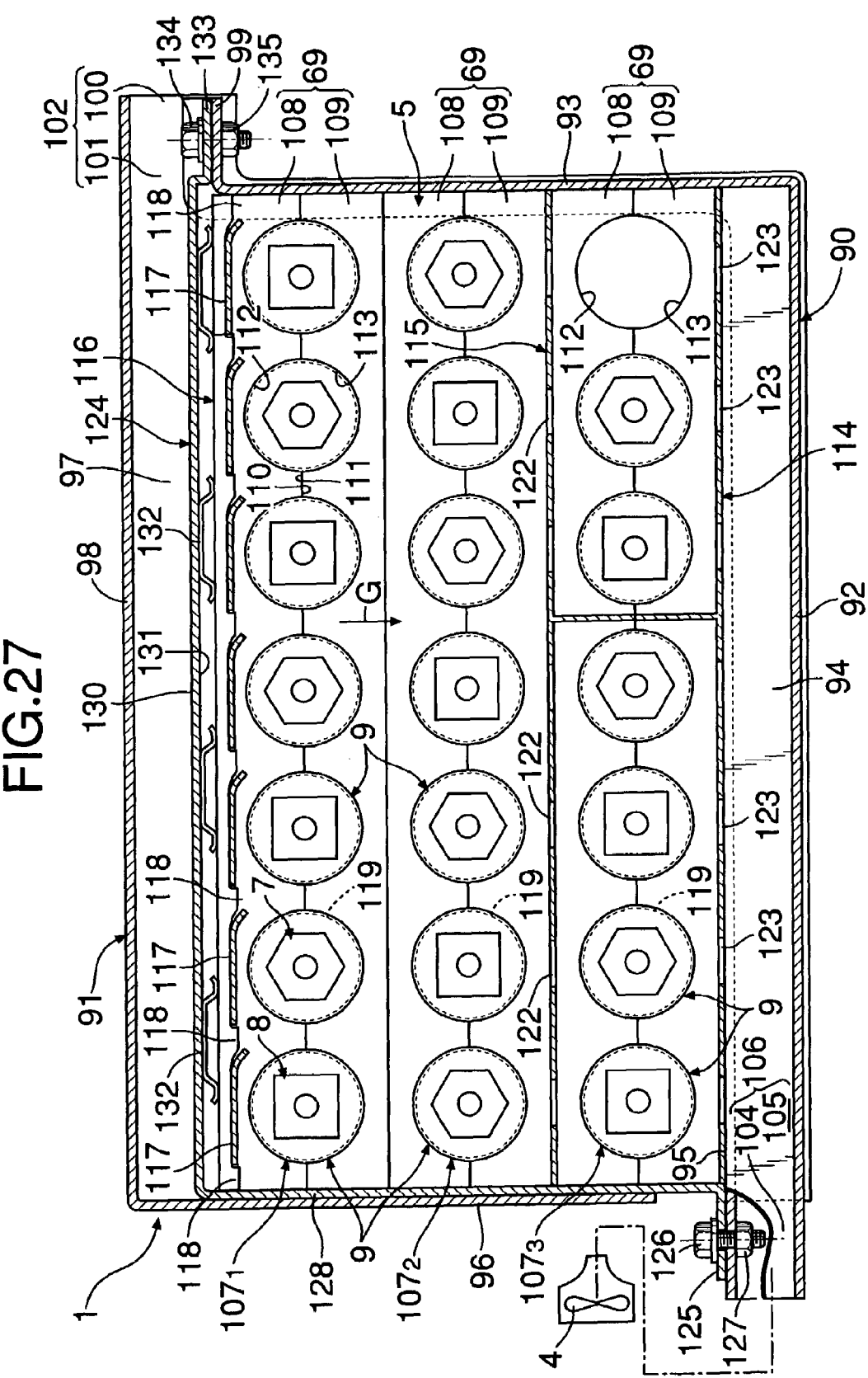
FIG. 27 is a cross section, corresponding to FIG. 19, showing another example of the battery-type power supply unit.

FIG. 27 shows another embodiment, in which a passage 101 of a cooling air infeed part 102 is formed so as to have a substantially identical cross section along its whole length from an inlet 100. In such a case, a strip-shaped portion 117 is provided for a rod-shaped battery module 9 that is positioned furthest from the inlet 100 in a first battery module group $107_1$. A passage 105 of a cooling air outfeed part 106 is also formed so as to have a substantially identical cross section along its whole length to an outlet 104.

What is claimed is:

1. A power supply unit comprising:
   a battery assembly in which a plurality of rod-shaped battery modules having a plurality of batteries connected together in series and having a positive electrode at one end and a negative electrode at the other end are arranged so that axes of the battery modules are parallel to each other and, in a plane intersecting these axes, points of intersection of the axes and the plane are aligned in both a vertical direction and a lateral direction relative to the axes, the battery assembly having positive/negative electrode groups that are formed from a plurality of positive electrodes and a plurality of negative electrodes and are disposed at axially opposite ends of the battery modules;
   an insulating ring disposed directly between and in direct contact with two opposing ends of adjacent batteries of each battery module, the insulating ring having annular recesses into which the two opposing ends fit, a connection between a positive electrode and a negative electrode being in a region surrounded by an inner peripheral surface of the insulating ring;
   each battery module running through and being retained by a plurality of plate-shaped members that stand on a base plate and are parallel to the plane;
   each plate-shaped member being kept vertical by a gantry-shaped frame member that has an upper linking portion abutting against an upper end face of the plate-shaped member and has legs fixed to the base plate;
   each plate-shaped member being an assembly of a plurality of grommets formed from two split halves, the two halves having a semi-annular recess that opens on a split surface and is fitted around a semi-circumferential portion of an outer peripheral surface of the insulating ring; and
   a plurality of through holes into each of which one of either the positive and negative electrode is fitted and a plurality of bus-bars that are each connected to the positive or negative electrode fitted in the through hole being provided in each bus-bar plate facing each positive/negative electrode group of the battery assembly,
   wherein the connection between each bus-bar and the positive or negative electrode is movable toward and away from the positive or negative electrode.

2. The power supply unit according to claim 1, wherein a recess and a projection that are fitted together are provided on an inner peripheral surface of the semi-annular recess of the two halves of each grommet and the outer peripheral surface of each insulating ring that fits with the inner peripheral surface of the two semi-annular recesses.

3. The power supply unit according to claim 1, wherein a recess and a projection that are fitted together are provided on the inner peripheral surface of the semi-annular recesses of the two halves of each grommet and the outer peripheral surface of each insulating ring that fits with the inner peripheral surface of the two semi-annular recesses, and a first position where the recess and the projection are fitted together in one of two adjacent battery modules is displaced in the axial direction of the battery modules relative to a second position where the recess and the projection are fitted together in the other of the two adjacent battery modules.

4. A power supply unit comprising:
   a battery assembly in which a plurality of rod-shaped battery modules having a plurality of batteries connected together in series and having a positive electrode at one end and a negative electrode at the other end are arranged so that axes of the battery modules are parallel to each other and, in a plane intersecting these axes, points of intersection of the axes and the plane are aligned in both a vertical direction and a lateral direction relative to the axes, the battery assembly having positive/negative electrode groups that are formed from a plurality of positive electrodes and a plurality of negative electrodes and are disposed at axially opposite ends of the battery modules;
   wherein a plurality of through holes into each of which the positive or negative electrode is fitted, and a plurality of bus-bars that are each connected to the positive or negative electrode fitted in the through hole are provided in each bus-bar plate facing each positive/negative electrode group of the battery assembly wherein the connections between each bus-bar and the positive or negative electrode are movable toward and away from the positive or negative electrode, and wherein each bus-bar comprises:
- a mounting portion that contacts the corresponding bus-bar plate,
- a bifurcated portion,
- a bent portion extending away from the mounting portion and connecting the mounting portion to the bifurcated portion,
- a pair of bridge portions extending from the bifurcated portion to corresponding connecting portions positioned in a common plane as the mounting portion.

5. A power supply unit comprising:

a box having at one end a cooling air infeed part and at the other end a cooling air outfeed part, and a battery assembly disposed within the box;

the battery assembly having first to third battery module groups that are arranged at intervals in parallel to each other along a direction of flow of cooling air through the box;

the first to third battery module groups being formed from a plurality of rod-shaped battery modules that are arranged at equal intervals so that axes of the battery modules intersect the direction of flow of the cooling air within a first plane intersecting the direction of flow of the cooling air;

the axes of one rod-shaped battery module and another rod-shaped battery module that are adjacent to each other in the direction of flow of the cooling air being positioned within a second plane that is parallel to the direction of flow of the cooling air;

wherein the power supply unit includes:
- a first rectifying flat plate disposed on the cooling air infeed part side of the first battery module group that is present in the position closest to the cooling air infeed part,
- a second rectifying flat plate disposed between the second and third battery module groups, and
- a third rectifying flat plate disposed on the cooling air outfeed part side of the third battery module group;
  - the first rectifying flat plate having a plurality of strip-shaped portions that extend in the axial direction of the plurality of rod-shaped battery modules of the first battery module group and face these rod-shaped battery modules across a gap, and
  - a plurality of slits that are present between two adjacent strip-shaped portions and face a space between two adjacent battery modules, satisfying the relationship $w_1 \geqq e$ where e is the outer diameter of the rod-shaped battery module and $w_1$ is the width of the strip-shaped portion corresponding to the outer diameter e;
  - the second rectifying flat plate having a plurality of slits that face the outer peripheral surface of each rod-shaped battery module of the second and third battery module groups, satisfying the relationship $e > w_2$ where e is the outer diameter of the rod-shaped battery module and $w_2$ is the width of the slit corresponding to the outer diameter e; and
  - the third rectifying flat plate having a plurality of slits that face the outer peripheral surface of each rod-shaped battery module of the third battery module group, satisfying the relationship $e > w_3$ where e is the outer diameter of the rod-shaped battery module and $w_3$ is the width of the slit corresponding to the outer diameter e.

* * * * *